(12) United States Patent
Raffaelli et al.

(10) Patent No.: US 12,325,483 B2
(45) Date of Patent: Jun. 10, 2025

(54) SADDLE RIDING ROLLING LOADING SURFACE PLACED ABOVE THE UPPER CROSS MEMBER OF THE ROLLING FOUR-BAR LINKAGE

(71) Applicant: PIAGGIO & C. S.P.A., Pontedera (IT)

(72) Inventors: Andrea Raffaelli, Pontedera (IT); Mario Donato Santucci, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 18/568,333

(22) PCT Filed: Jun. 8, 2022

(86) PCT No.: PCT/IB2022/055340
§ 371 (c)(1),
(2) Date: Dec. 8, 2023

(87) PCT Pub. No.: WO2022/259178
PCT Pub. Date: Dec. 15, 2022

(65) Prior Publication Data
US 2024/0270342 A1 Aug. 15, 2024

(30) Foreign Application Priority Data

Jun. 11, 2021 (IT) .................. 102021000015359

(51) Int. Cl.
*B62K 5/05* (2013.01)
*B62K 5/025* (2013.01)
(Continued)

(52) U.S. Cl.
CPC ............... *B62K 5/05* (2013.01); *B62K 5/025* (2013.01); *B62K 5/027* (2013.01); *B62K 5/08* (2013.01);
(Continued)

(58) Field of Classification Search
CPC . B62K 5/05; B62K 5/027; B62K 5/08; B62K 2005/001
See application file for complete search history.

(56) References Cited

U.S. PATENT DOCUMENTS 2,570,970 A * 10/1951 Murray ............... B62J 1/02
248/397
3,796,460 A * 3/1974 Potchen ............... B62J 1/02
297/211
(Continued)

FOREIGN PATENT DOCUMENTS

JP 2021020595 A 2/2021
NL 1032554 C1 3/2008
(Continued)

*Primary Examiner* — Frank B Vanaman
(74) *Attorney, Agent, or Firm* — McGlew and Tuttle, P.C.

(57) ABSTRACT

The motor vehicle comprises two front steering and rolling wheels (4, 4') and at least one rear rolling wheel (9). The motor vehicle comprises a rolling four-bar linkage (10) connected to a frame (2A-2B) and which supports the front steered wheels (4, 4'). A suspension group (71, 71') is interposed between the front wheels (4, 4') and the rolling four-bar linkage (10) to allow movement of the front wheels with respect to the rolling four-bar linkage (10). The rolling four-bar linkage (10) comprises: a lower cross member (11) and an upper cross member (12) hinged to the frame to pivot around first roll axes (101, 101'); and a right upright (21) and a left upright (21') hinged to the cross members (11, 12) so as to rotate around second roll axes (212, 212', 221, 221') parallel to the first roll axes (101, 101'). The lower cross member (11) extends along a longitudinal direction and above the upper cross member (12) so as to carry a load above the upper cross member.

21 Claims, 21 Drawing Sheets

(51) Int. Cl.
  *B62K 5/027* (2013.01)
  *B62K 5/08* (2006.01)
  *B62K 5/10* (2013.01)
  *B62K 7/04* (2006.01)
  *B62K 5/00* (2013.01)

(52) U.S. Cl.
  CPC ............... *B62K 5/10* (2013.01); *B62K 7/04* (2013.01); *B62K 2005/001* (2013.01)

(56) References Cited

U.S. PATENT DOCUMENTS

| | | | |
|---|---|---|---|
| 4,088,199 A | 5/1978 | Trautwein | |
| 4,375,293 A * | 3/1983 | Solbes | B62K 5/10 |
| | | | 280/22.1 |
| 4,740,004 A * | 4/1988 | McMullen | B62K 5/08 |
| | | | 280/282 |
| 2008/0258416 A1 | 10/2008 | Wilcox | |
| 2010/0194068 A1 * | 8/2010 | Henderson | B62D 9/02 |
| | | | 280/124.103 |
| 2011/0006498 A1 * | 1/2011 | Mercier | B62D 9/02 |
| | | | 280/124.103 |
| 2014/0311815 A1 * | 10/2014 | Reck | B62K 5/05 |
| | | | 180/210 |
| 2015/0203154 A1 * | 7/2015 | Mighell | B62D 9/02 |
| | | | 280/281.1 |
| 2018/0050755 A1 * | 2/2018 | Walter | B62K 5/06 |
| 2018/0265154 A1 * | 9/2018 | Mulyadi | B62M 6/70 |

FOREIGN PATENT DOCUMENTS

| | | |
|---|---|---|
| WO | 2017017636 A1 | 2/2017 |
| WO | 2017017639 A1 | 2/2017 |
| WO | 2017021905 A1 | 2/2017 |
| WO | 2017021906 A1 | 2/2017 |
| WO | 2017115274 A1 | 7/2017 |
| WO | 2017115293 A1 | 7/2017 |
| WO | 2017115294 A1 | 7/2017 |
| WO | 2017115295 A1 | 7/2017 |
| WO | 2017115296 A1 | 7/2017 |
| WO | 2017115297 A1 | 7/2017 |
| WO | 2018007911 A1 | 1/2018 |
| WO | 2018104862 A1 | 6/2018 |
| WO | 2018104906 A1 | 6/2018 |
| WO | 2018116210 A1 | 6/2018 |
| WO | 2018116211 A1 | 6/2018 |
| WO | 2018116214 A2 | 6/2018 |
| WO | 2018158743 A1 | 9/2018 |
| WO | 2018172908 A1 | 9/2018 |
| WO | 2020065577 A1 | 4/2020 |
| WO | 2020172685 A1 | 8/2020 |

* cited by examiner

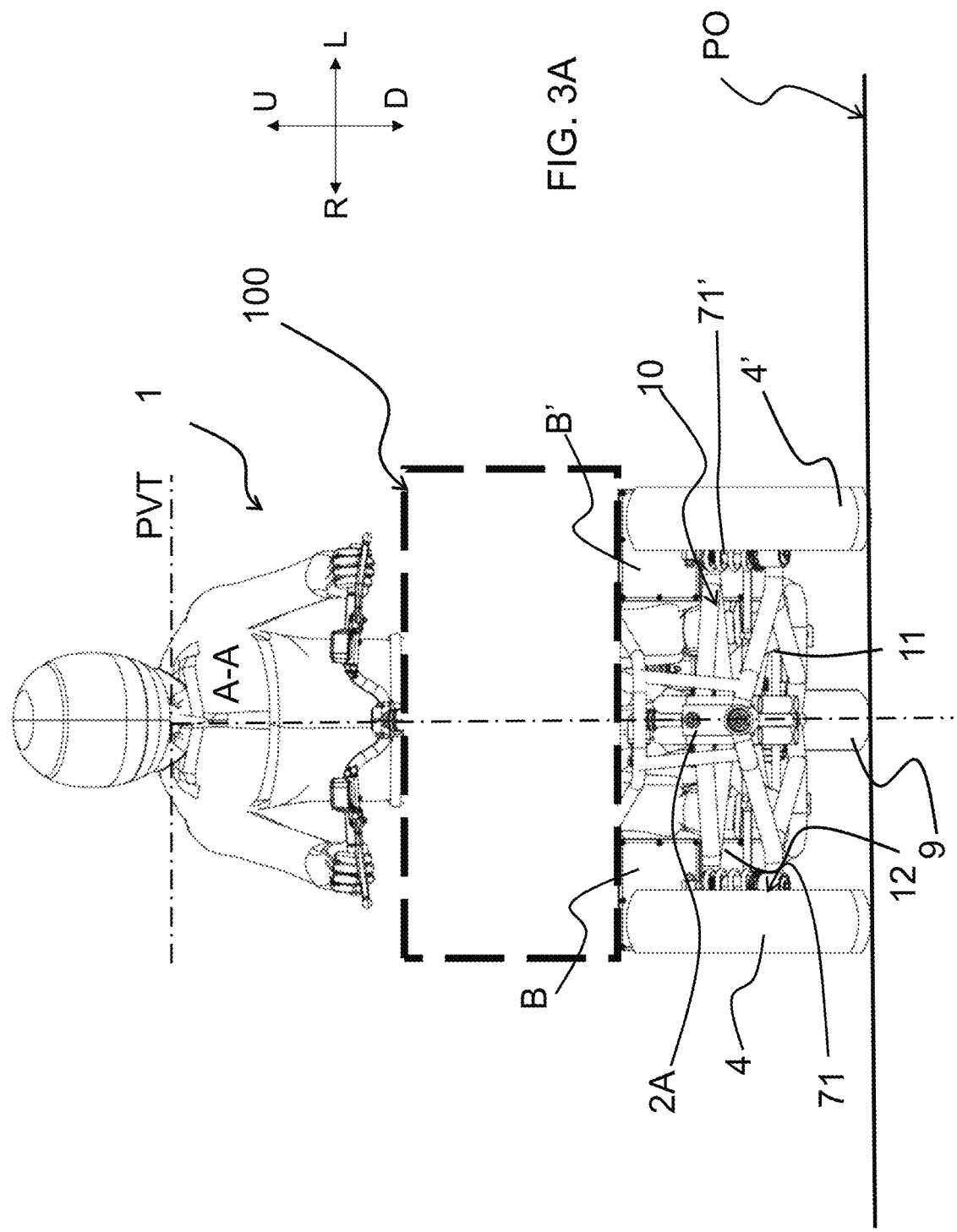

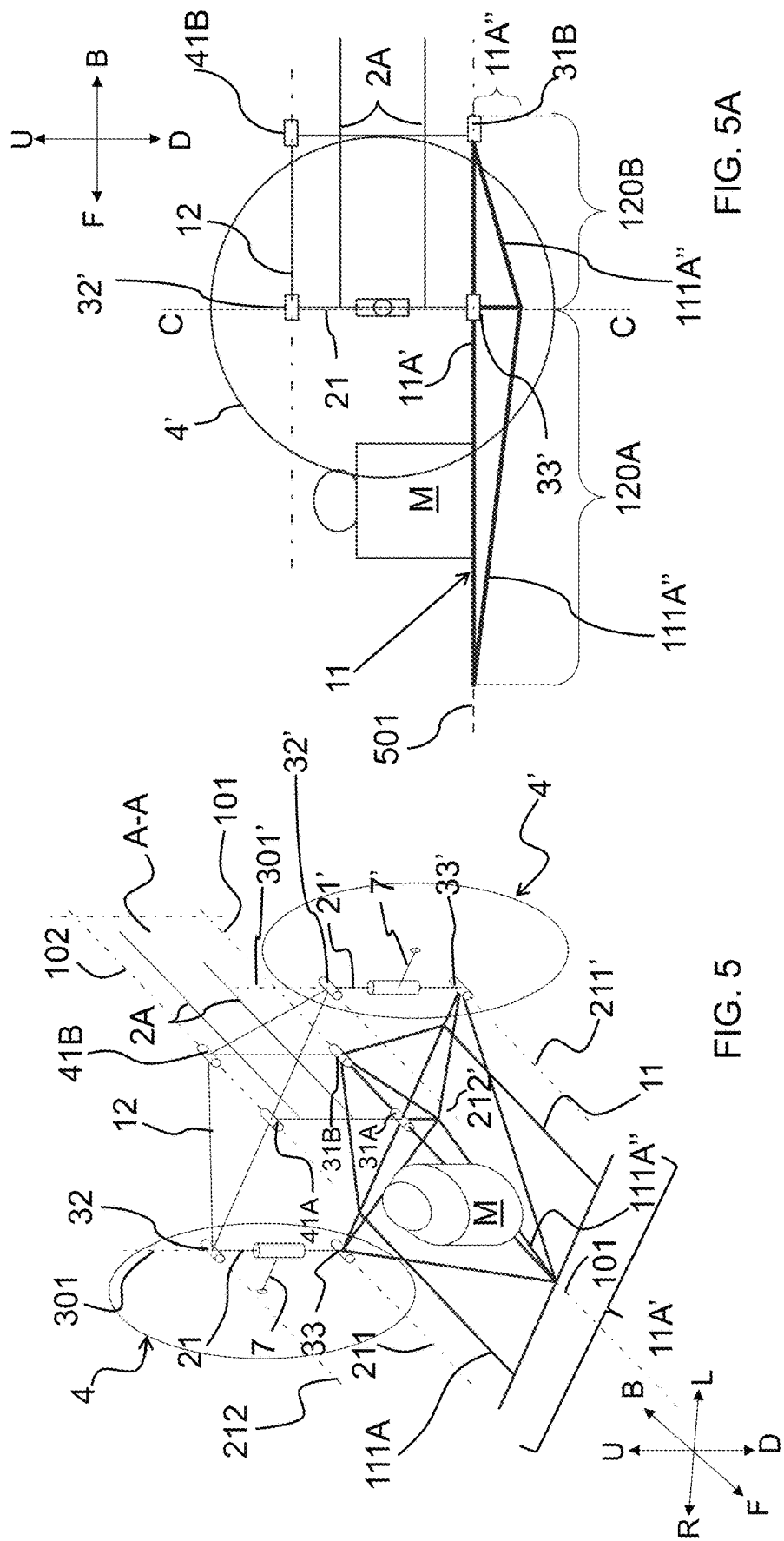

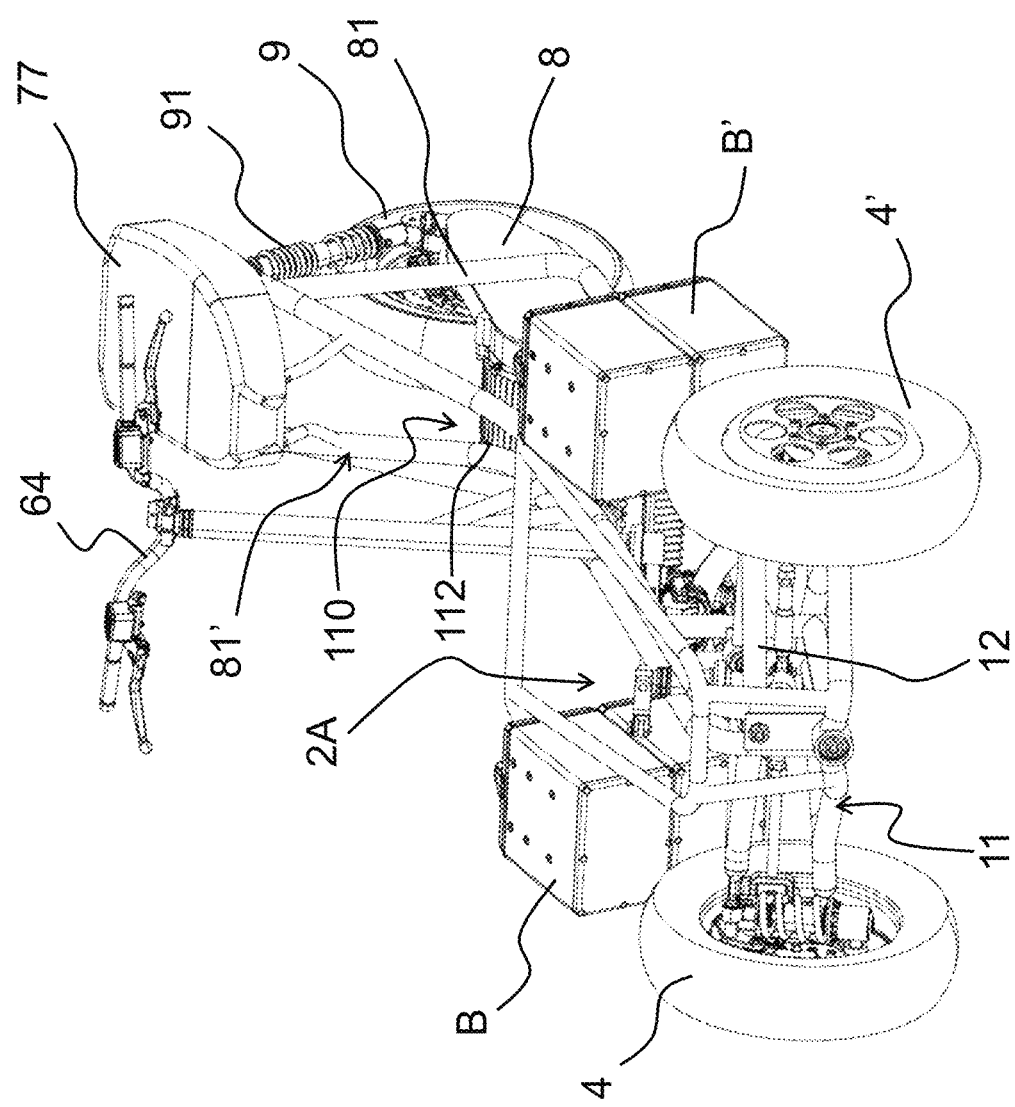
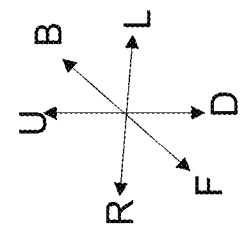
FIG. 7

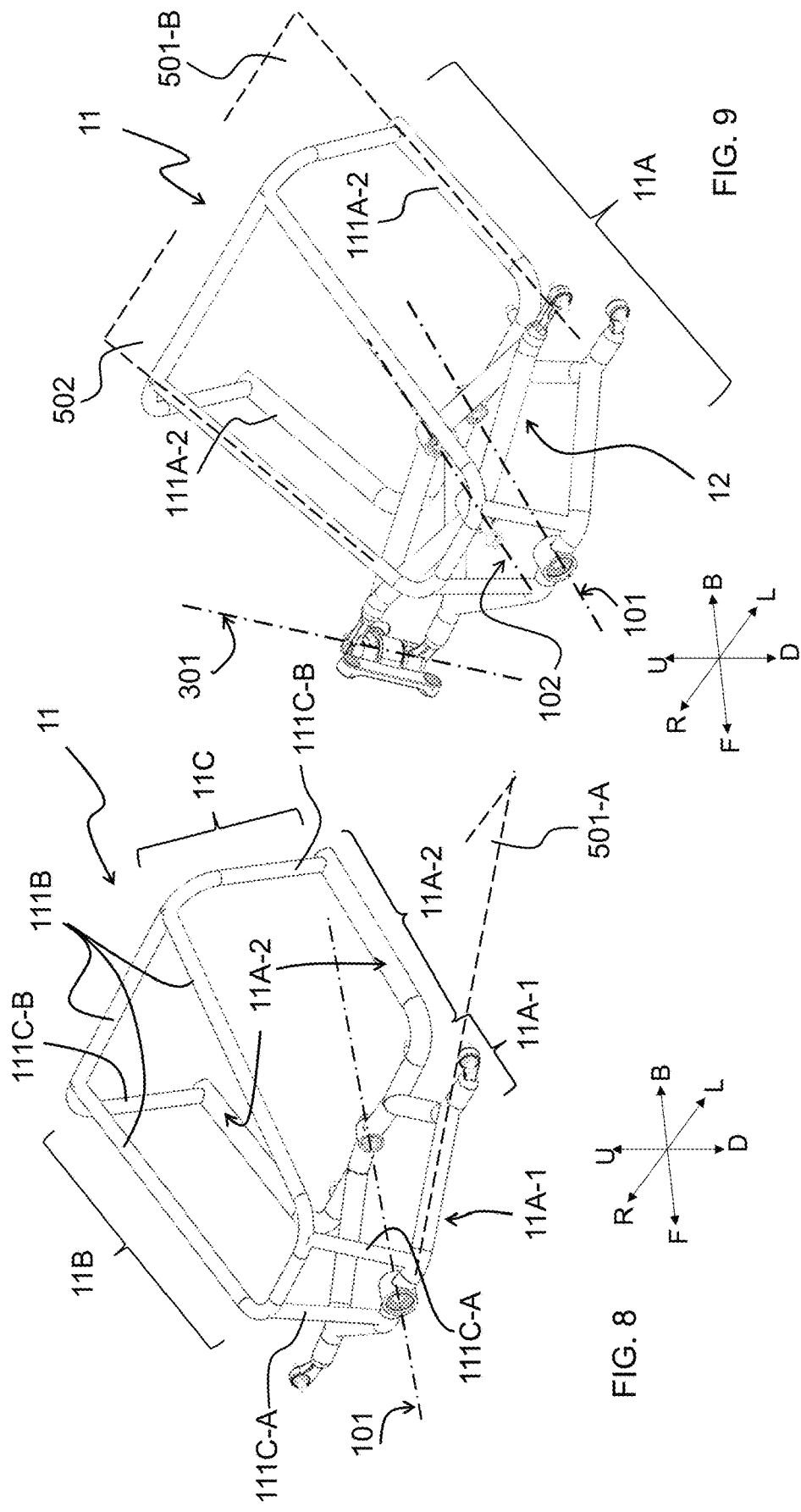

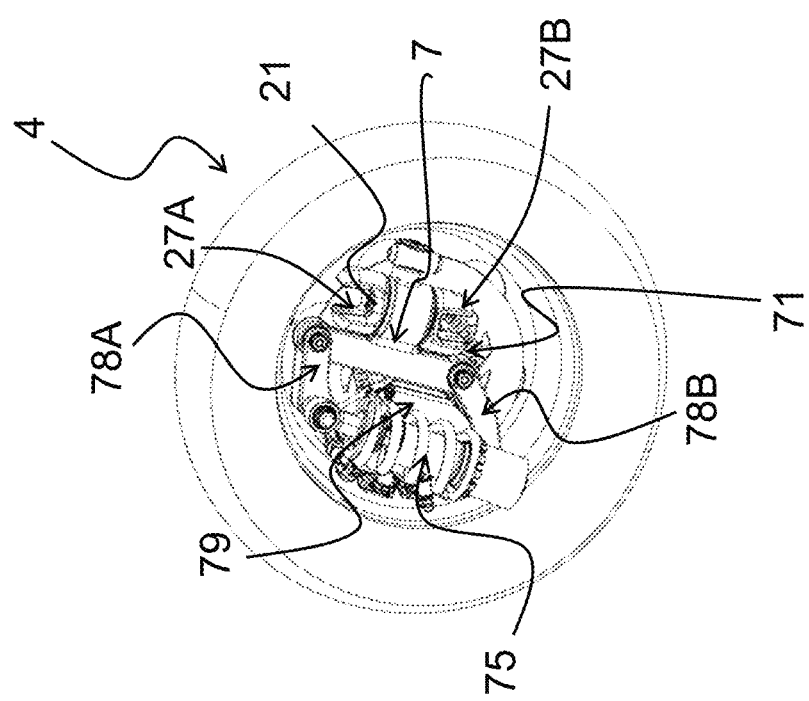
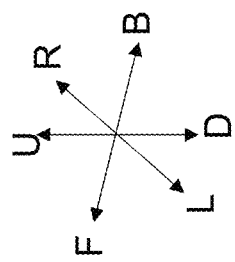
FIG. 12A

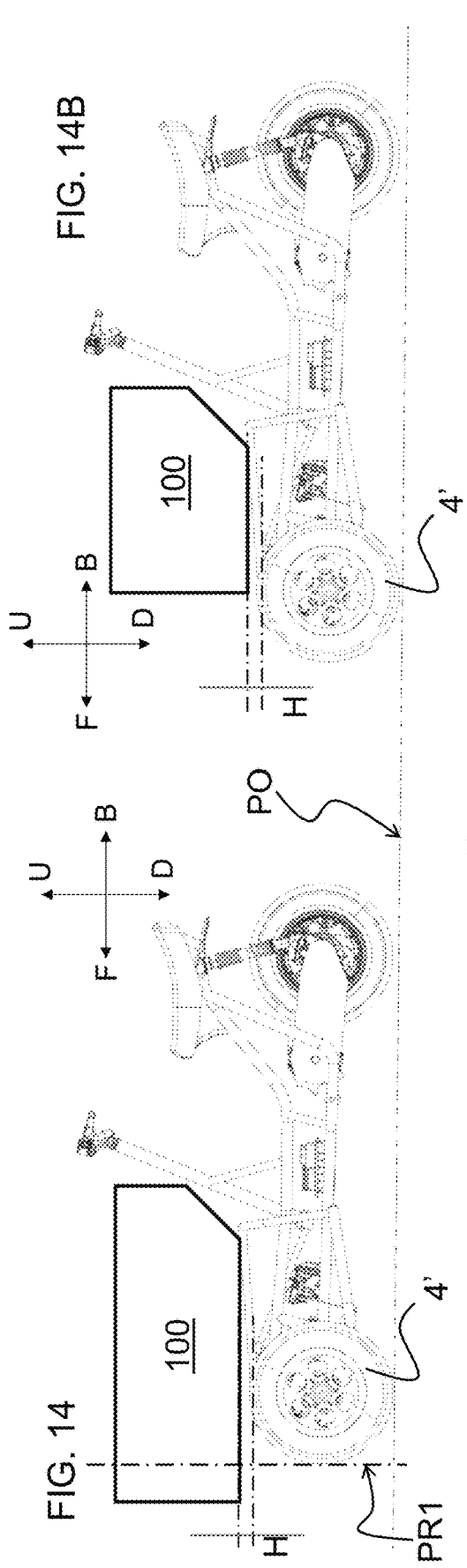
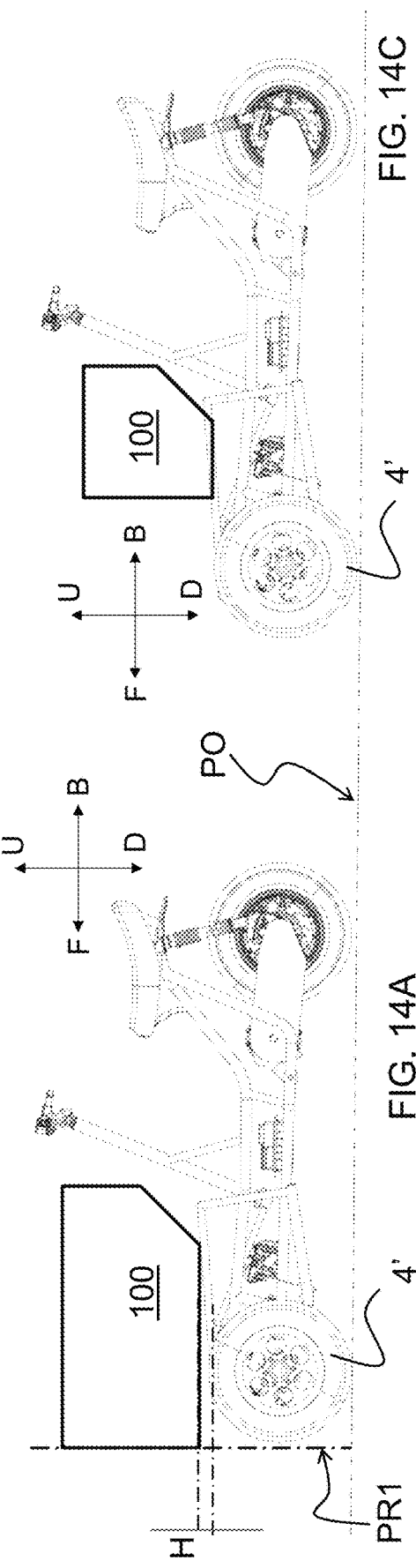

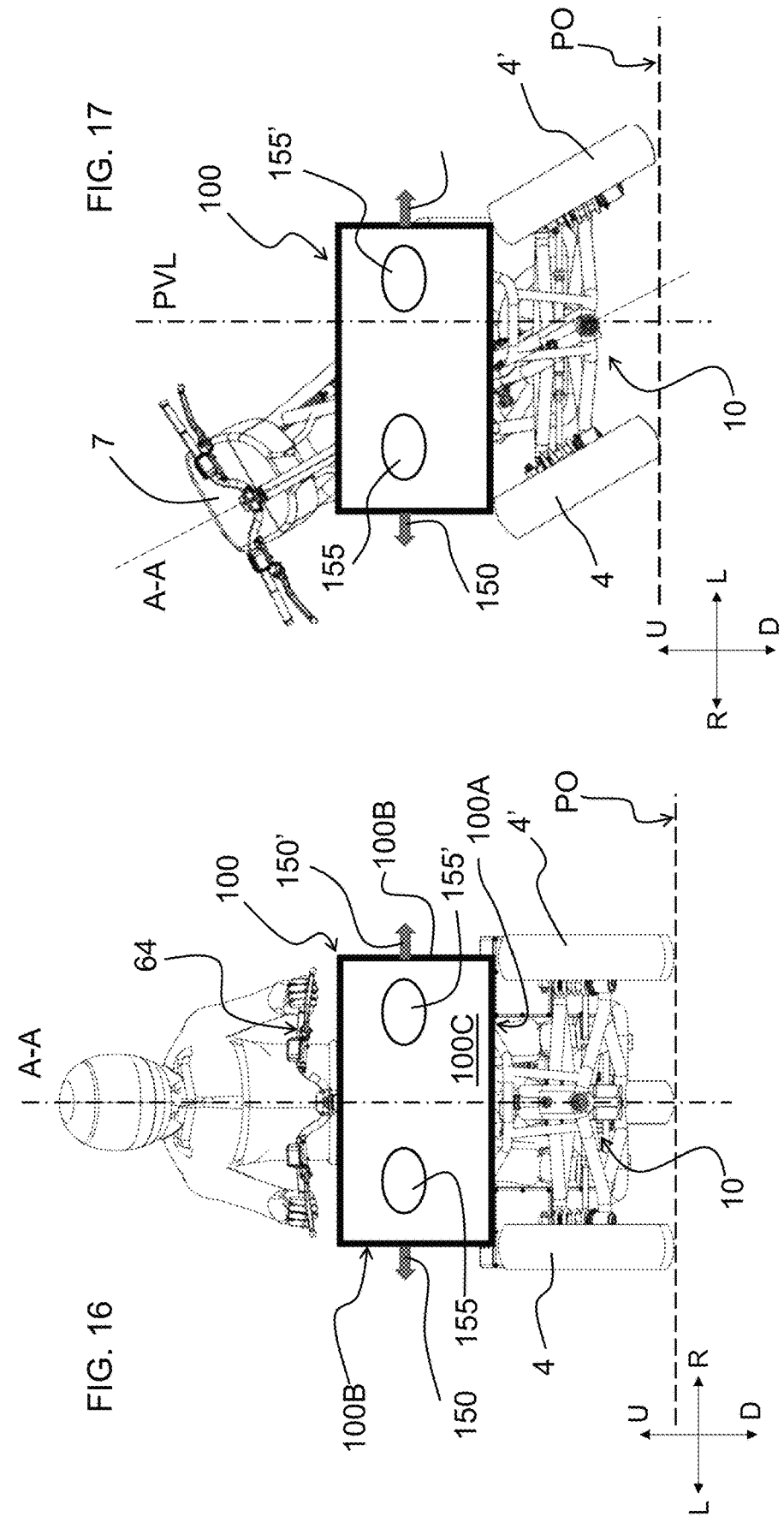

SADDLE RIDING ROLLING LOADING SURFACE PLACED ABOVE THE UPPER CROSS MEMBER OF THE ROLLING FOUR-BAR LINKAGE

TECHNICAL FIELD

The present invention falls within the field of manufacturing rolling motor vehicles, i.e. motor vehicles provided with a rolling movement around a median plane extending longitudinally along the vehicle. In particular, the invention relates to a rolling vehicle, with three or four wheels, with a front end defining a non-rolling load area, that is, not subject to rolling movements while the vehicle is running.

BACKGROUND ART

Among the different types of vehicles currently on the market there are three-wheeled vehicles in which two front wheels are steered and one rear wheel is driving. In these vehicles, the two front wheels are connected to the vehicle frame so as to be tilting laterally, following a rolling movement around an axis oriented according to the direction of travel and lying on a median plane of the vehicle which develops longitudinally.

To allow the front wheels to roll, a four-bar linkage mechanism is usually provided between the front wheels and a front part of the frame. Typically, the four-bar linkage mechanism comprises a pair of cross members, each of which is hinged to the frame at the longitudinal center-line plane, so as to pivot around mutually parallel axes. The four-bar linkage also comprises a pair of uprights for each of which the two ends are hinged to a corresponding one of the two cross members, defining rotation axes parallel to those of the cross members with respect to the frame. The two uprights are connected to a wheel support element so that the latter can rotate around a steering axis, wherein the steering movement is controlled by a steering system that is operatively independent of the four-bar linkage.

The vehicle comprises a suspension assembly which includes, for each front wheel, a suspension interposed between the wheel and the corresponding upright of the four-bar linkage. For each front wheel, the suspension comprises at least one shock absorber which allows the jolting movement of the corresponding front wheel with respect to the four-bar linkage. A jolting movement as understood herein is a lifting and lowering movement caused by the unevenness of the ground on the wheels of the motor vehicle.

The possibility of tilting sideways, due to the rolling movement, causes the vehicle to behave, in curves, like a traditional two-wheeled vehicle (for example like a motorcycle). The suspensions associated with the front wheels are interconnected through the four-bar linkage so that they can react separately according to the stresses. If, for example, the vehicle faces an obstacle with the two wheels at the same time, the suspensions work in parallel, while if the obstacle affects only one wheel, then the suspensions work individually in series. Overall, rolling three-wheeled vehicles have a natural anti-sinking effect when braking or supporting the load given by the stiffness of the suspension when working in parallel. At the same time, when they work in series, the suspensions are softer, favoring, for example, driving on uneven ground in which the wheels usually face obstacles of a different entity substantially at all times. Basically, the interconnection between the suspensions balances the forces on the ground, favouring the grip of the tires in substantially all driving conditions.

At present, three-wheeled tilting vehicles are used exclusively for the transport of the pilot and possibly an additional passenger. However, these vehicles have a very limited load capacity (in terms of weight and volumes) reserved for the rear end part. In this regard, according to a typical solution also provided in two-wheeled motorcycles, a top case supported by a rear frame is provided in the rear part of the motor vehicle. In some cases, the load capacity is increased by placing a pair of containers (in the form of bags or in the form of cases) on the sides of the saddle, always at the rear part of the vehicle.

The Applicant has found that the load capacity of three-wheeled tilting vehicles is in some cases even lower than that of two-wheeled motorcycles or that of tricycles, that is, motorcycles provided with two rear driving wheels and a single front steered wheel. In the case of two-wheeled scooters, for example, in addition to the rear case, a support structure (luggage rack) is provided at the front, in particular in a position above the front wheel. This solution is also provided for tricycles, which provide a larger loading area in the rearmost part than that obtainable in scooters.

A three-wheeled tilting vehicle with the carrying capacity of a second passenger is disclosed in JP202120595. In this known vehicle, a seat for a passenger is fixed to the lower cross member of a front rolling four bar linkage, which connects the front steered wheels to the vehicle frame. The passenger is at a higher height than the front steered wheels and in a forward position with respect to them. The passenger seat extends downward from the four-bar linkage, which is located higher than the front steered wheels. To avoid that the load, in this case the passenger, collides with the front steered wheels, the four-bar linkage must be placed in a very high position with respect to the surface on which the vehicle is supported. This distance causes large transverse movements of the load, i.e., of the passenger, when the vehicle leans with a non-zero roll angle, for example when the vehicle makes a curve.

Faced with this evidence, the Applicant has therefore ascertained the need to provide a solution that allows the load capacity in a rolling three-wheeled vehicle or even in a rolling four-wheeled vehicle to be increased.

SUMMARY

The task of the present invention is to provide a rolling motor vehicle having a load capacity larger than that of known three or four-wheeled rolling vehicles. Within this task, a first object of the present invention is to increase the load capacity without increasing the number of load modules (cases, bags, etc.) associated with the rear end. Another object of the present invention is to increase the load capacity of a rolling motor vehicle irrespective of the propulsion mode contemplated for the same. A further object is to increase the load capacity of a rolling motor vehicle without compromising the stability thereof during travel. Last but not least, an object of the present invention is to provide a rolling motor vehicle which is easy to manufacture at relatively competitive costs.

The Applicant has found that the aforementioned task and objects can be achieved by intervening on the structure of the cross members of the rolling four-bar linkage (in short hereinafter also referred to simply as "four-bar linkage"), in particular on the structure of the lower cross member. More precisely, the idea behind the invention is to configure a lower cross member of the rolling four-bar linkage so that it extends not only in the transverse direction, as in known solutions, but also in the longitudinal direction and in the vertical direction, in order to support an additional load, in particular a loading structure (for example in the form of a compartment), other than the cross member itself, in a position above the upper cross member. This solution takes the form of a loading area defined in the front part of the motor vehicle, which is not subject to rolling movements, or is subject only to minimal rolling movements. In fact, due to the kinematics of the four-bar linkage, this additional mass is subject only to translation movements on a transverse plane and maintains approximately the same orientation with respect to the support plane of the motor vehicle. In addition, the general increase in the mass of the front part greatly increases the stability of the vehicle.

In particular, the Applicant has found that the aforementioned task and objects are achieved by means of a saddle riding motor vehicle comprising:
- a frame;
- a motor;
- a rolling four-bar linkage connected to the frame, wherein the rolling four-bar linkage supports a first steered front wheel and a second steered front wheel, allowing the first front wheel and the second front wheel to roll;
- a steering assembly rotatably connected to the frame to control the front wheels;
- a suspension group interposed between the front wheels and the rolling four-bar linkage to allow the jolting, i.e. lifting and lowering movement, of the front wheels with respect to the rolling four-bar linkage.

According to the invention, the rolling four-bar linkage comprises a lower cross member and an upper cross member hinged to the frame so as to pivot around first parallel roll axes which substantially lie on a central plane of the motor vehicle. The rolling four-bar linkage also comprises a right upright and a left upright hinged to the cross members so as to rotate about second roll axes parallel to the first roll axes.

The lower cross member of the rolling four-bar linkage is shaped so as to extend along a longitudinal direction of the motor vehicle so as to support a further load having a mass. Preferably, the load is supported on at least three non-aligned points of the lower cross member. Furthermore, the lower cross member includes a lower portion and an upper portion. The upper portion of the lower cross member is configured to support a load and lies above the upper cross member in any operating condition of the motor vehicle, that is, with any possible roll angle that can be reached in running conditions, of the rolling four-bar linkage.

In practical embodiments, the lower cross member comprises a connecting portion, which connects the upper portion to the lower portion of the lower cross member. In practice, the connecting portion extends above the upper cross member in a vertical direction, defining a load supporting plane or surface.

In this way, unlike what happens in the vehicles of the prior art, the loading surface is easily accessible, does not interfere with other parts of the vehicle and is such as to limit the translation movement of the load in the right-left direction when the vehicle tilts, for example when making a curve, and consequently taking a position with a non-zero roll angle. In fact, the loading surface follows the movement of the lower cross member, which is closer to the support surface of the vehicle and therefore performs translation movements in the right-left direction that are smaller than those performed by the upper cross member.

In advantageous embodiments, in a vertical position of the motor vehicle, i.e. with zero roll angle, and in a non-steered condition on a horizontal support surface, the lower cross member is located at an intermediate height between the support surface of the motor vehicle and a point of maximum height of the left front wheel and of the right front wheel. That is, in practice the lower cross member is located in a volume between the left front wheel and the right front wheel. This position is closer to the support surface than in vehicles where the rolling four-bar linkage is located above the front wheels. Consequently, by virtue of the greater proximity of the lower cross member to the ground, i.e. to the support surface of the motor vehicle, a reduction of the transverse movement in the right-left direction of the lower cross member, and therefore of the load, is obtained when the motor vehicle tilts laterally, taking a non-zero roll angle. Since the load is integral with the lower cross member, even if it is above the upper cross member, when the vehicle tilts with a rolling movement, the load makes a particularly small movement in the transverse direction (right-left). This results in better vehicle control and improved driving comfort.

In particularly advantageous embodiments, also the upper cross member is placed at an intermediate height between the support plane of the motorcycle and a point of maximum height of the left front wheel and of the right front wheel, i.e. it is located in the volume between the two front steered wheels.

Basically, in advantageous embodiments, the front steered wheels are connected to the two uprights of the four-bar linkage at an intermediate point of the uprights between the hinges which connect the lower cross member to the uprights and the hinges which connect the upper cross member to the uprights. In this way, in practice, the upper cross member of the four-bar linkage can be placed at a height equal to or lower than the diameter of the front wheels. The lower cross member is located lower than the rotation axes of the front wheels and therefore in a position particularly close to the vehicle support plane, i.e., to the ground. The roll axis, i.e., the axis around which the vehicle tilts when it takes a non-zero roll angle, is located on the vehicle support plane.

Further features and embodiments are described below with reference to the accompanying drawings and are defined in the appended claims.

The powertrain, i.e., the motor vehicle engine, may be a thermal engine or an electric motor. In some embodiments, the motor vehicle may be hybrid and comprise an electric motor and a combustion engine in combination. The possibility of using two electric motors in combination is not excluded. For example, the front steered wheels may each be associated with a respective electric motor. In some embodiments, a combustion engine may be used to drive the rear wheel, in combination with two electric motors on the front wheels. In general, therefore, the front wheels and/or the rear wheel can be driving.

In the detailed description of embodiments that follows, reference will be made to a rear-wheel drive motor vehicle, i.e. having an electric motor or a combustion engine that drives the rear driving wheel, but this configuration is exemplary and non-limiting.

In a possible embodiment, the lower cross member comprises a front part which extends in front of the uprights and a rear part which extends at least partly behind the uprights, wherein said front part has a longitudinal extension, starting from the uprights, greater than the longitudinal extension, starting from the uprights, of said rear part.

According to a possible embodiment, the uprights have a longitudinal extension greater than the height.

According to a possible embodiment, the lower cross member is arranged in a longitudinally advanced position with respect to said upper cross member.

According to an embodiment, for each of said uprights a support element is provided which directly or indirectly supports the corresponding front wheel, said support element being rotatable with respect to the corresponding upright around a steering axis.

In a possible embodiment, the steering assembly comprises a steering column, operated by a handlebar, and a lever mechanism which operatively connects the steering column to a steering rod, wherein the latter comprises two opposite ends each of which connected to a corresponding one of said support elements.

In a possible embodiment, said support element directly connects the corresponding upright to the corresponding front wheel, said support element comprising a spindle with which the rotation pin of the corresponding front wheel is associated, wherein suspension means of said suspension group are interposed between said spindle and the corresponding upright.

In an alternative embodiment to the one mentioned above, said support element indirectly connects the corresponding upright to the corresponding front wheel, wherein, for each front wheel, said motor vehicle comprises:
- a spindle connected to the front wheel to allow the wheel to rotate around the axis thereof;
- at least one crank hinged to said spindle and to said support element;
- a shock absorber connected at one end to the support element and at the opposite end to said at least one crank or said spindle.

In a possible embodiment, the motor vehicle comprises an anti-roll device configured to block the deformation of the four-bar linkage.

In a possible embodiment, said load comprises a loading structure connected to the lower cross member, wherein said loading structure is configured to support and contain goods or passengers.

In a possible embodiment thereof, the loading structure has a transversal extension which is less than or equal to the width of the carriageway defined by the transverse distance between said front wheels.

In a possible embodiment, the loading structure defines a housing space adapted to entirely or partially house goods or passengers.

In a possible embodiment thereof, the loading structure comprises a bottom wall and one or more side walls, which extend above the bottom wall to delimit said housing space. Preferably, the bottom wall and/or a side wall of said compartment is directly or indirectly connected to the lower cross member of the rolling four-bar linkage.

In a possible embodiment, said loading structure is removably connected to said lower cross member.

In a possible modified embodiment, said loading structure extends in the longitudinal direction beyond the front wheels.

In a possible embodiment, said loading structure does not protrude beyond a front end of said front wheels.

In an embodiment thereof, the loading structure is configured for the transport of passengers, comprising one or more seats for as many passengers.

In a possible embodiment, elastic means are arranged between said loading structure and said lower cross member to cushion said load.

According to a possible embodiment, the motor vehicle comprises at least one battery directly or indirectly connected and supported by said lower cross member of the rolling four-bar linkage.

In a possible embodiment, said motor vehicle comprises at least one front headlight directly or indirectly connected to the lower cross member.

According to a further possible embodiment, the motor vehicle comprises two direction indicators directly or indirectly connected to the lower cross member of the rolling four-bar linkage.

According to a possible embodiment, the compartment-shaped loading structure comprises a compartment or a plurality of compartments and/or means for securing goods within said compartment or within one or more compartments of said plurality of compartments.

In another possible embodiment, the loading structure in the form of a compartment is configured for the transportation of food and/or medicines or more generally of goods which require a controlled temperature to avoid the deterioration thereof during the journey. Preferably, the motor vehicle comprises a refrigerating unit and/or a heating unit operatively associated with said structure in the form of a compartment to control the internal temperature thereof.

BRIEF DESCRIPTION OF THE DRAWINGS

Further features and advantages of the invention will become clearer from the following detailed description of some preferred, but not exclusive, embodiments of the vehicle, illustrated by way of non-limiting example, with the aid of the appended drawings, in which:

FIGS. 3A and 3B are front views relating to a third and a fourth possible embodiment of a vehicle according to the present invention, respectively;

FIGS. 5 and 5A are a perspective view and a side view, respectively, of a second possible embodiment of a rolling four-bar linkage of a motor vehicle according to the present invention;

FIG. 7 is a perspective view of a further embodiment of a vehicle according to the present invention;

FIGS. 8 and 9 are perspective views relating to components of a rolling four-bar linkage of the motor vehicle of FIG. 7;

FIG. 12A is a detailed view of a front wheel of the motor vehicle of FIG. 7;

FIGS. 14, 14A, 14B and 14C are side views, each relating to a possible embodiment of a motor vehicle according to the present invention;

FIGS. 16 and 17 are front views of a motor vehicle according to the invention during two possible running conditions thereof, respectively;

The same reference numerals and letters in the figures identify the same elements or components.

DETAILED DESCRIPTION

With reference to the aforementioned figures, the present invention therefore relates to a saddle riding vehicle 1 of the type comprising a left steered and rolling front wheel 4' and a right steered and rolling front wheel 4. The motor vehicle also comprises at least one driving and rolling rear wheel 9. Therefore, this definition also includes four-wheeled motor vehicles comprising two front steered wheels and two driving and rolling rear wheels.

For the purposes of the present invention, the expression "longitudinal direction" or "front-rear direction" means a direction parallel to the forward direction of the vehicle 1 and orthogonal to the rotation axis M of the drive wheel 9, while the expression "transverse direction" or "right-left" direction is meant to indicate a direction substantially orthogonal to the longitudinal direction and parallel to the rotation axis M of the drive wheel 9.

Finally, the expression "normal direction" or "up-down" direction indicates a direction orthogonal to the longitudinal direction and to the transverse direction. The figures include Cartesian reference axes indicating the front-back direction F-B, the up-down direction U-D and the right-left direction R-L defined above.

Therefore, the terms "longitudinally" or "longitudinal", the terms "transversely" or "transverse" and the terms "normally" or "normal" refer respectively to the longitudinal direction, i.e. front-back F-B, to the transverse direction, i.e. right-left R-L, and to the normal direction, i.e. up-down U-D. The terms "anteriorly", "left" and "above" refer to the lines indicated by the arrows of the half-lines F, L and U visible in the figures. The terms "posteriorly", "right" and "inferiorly" instead indicate opposite lines to those indicated by the arrows of the half-lines B, R and D.

Figure 3:
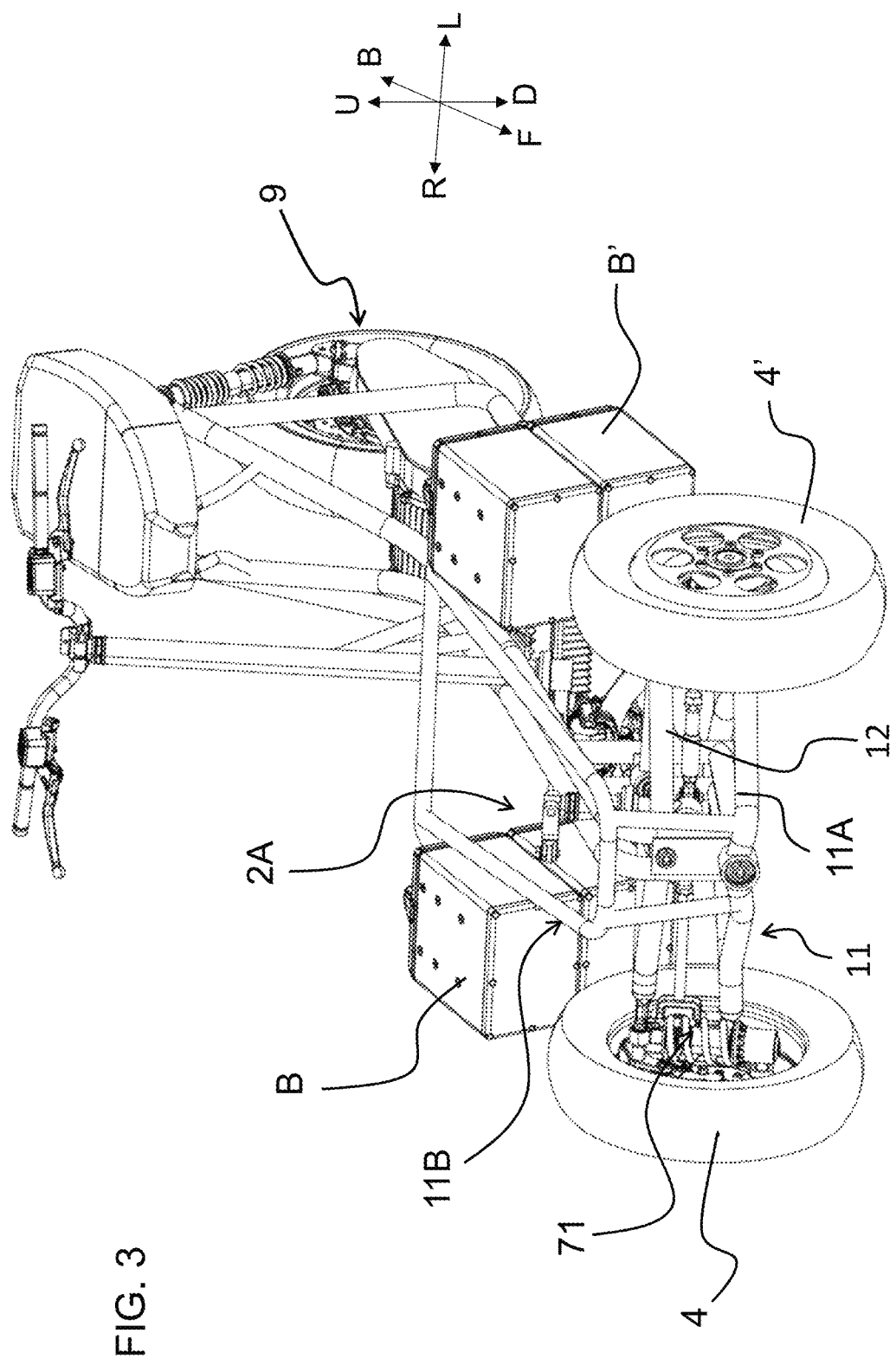
Figure 3B:
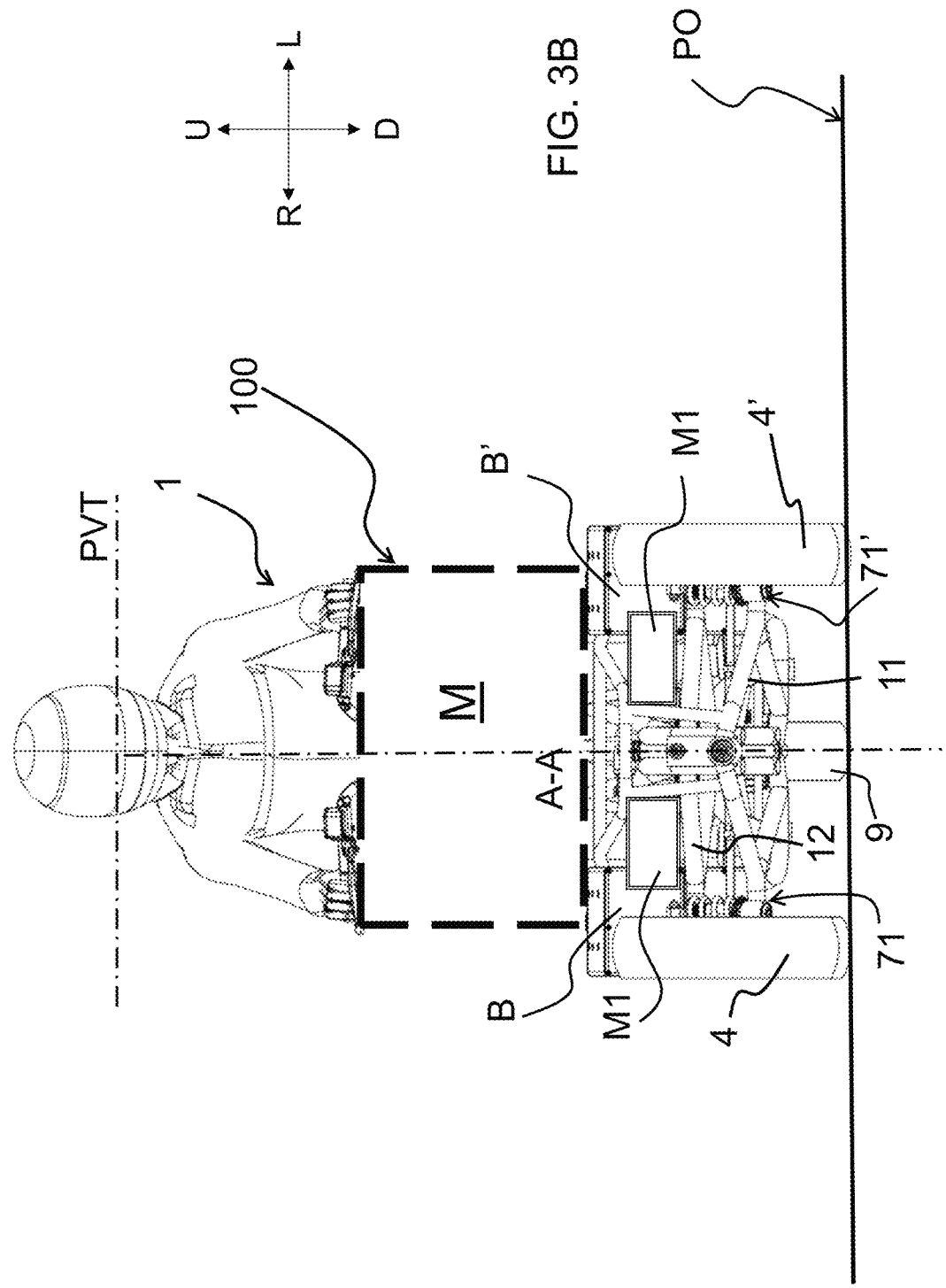

FIGS. 3A and 3B show a longitudinal center line A-A of the vehicle 1. Said plane A-A extends mainly in the longitudinal direction F-B of the motor vehicle 1 and results, when the vehicle does not roll, orthogonal to the transverse direction R-L, that is to the rotation axis M of the drive wheel 9 and vertical to the ground PO.

The center plane A-A divides the motor vehicle 1 into two half-portions: a right half-portion and a left half-portion. In the figures and in the following description, the components, groups or elements symmetrical with respect to the center plane A-A are indicated with the same reference numeral followed by a superscript (*) if the component, group or element is arranged on the left side of the centerline A-A, and without superscript if the component, group or element is instead arranged on the right side of the centerline A-A.

In FIG. 17, the reference PVL indicates a substantially vertical longitudinal reference plane which coincides with the centerline M-M when the motor vehicle 1 is not subject to rolling. Furthermore, in the following description, the expression "straight-wheel condition" is meant to indicate a state of the motor vehicle 1 in which there are no steering or rolling movements (condition visible for example in FIGS. 3A and 3B). The reference PVT in FIGS. 3A and 3B indicates a transverse reference plane PVT, i.e., orthogonal to the longitudinal reference plane PVL.

Figure 1:
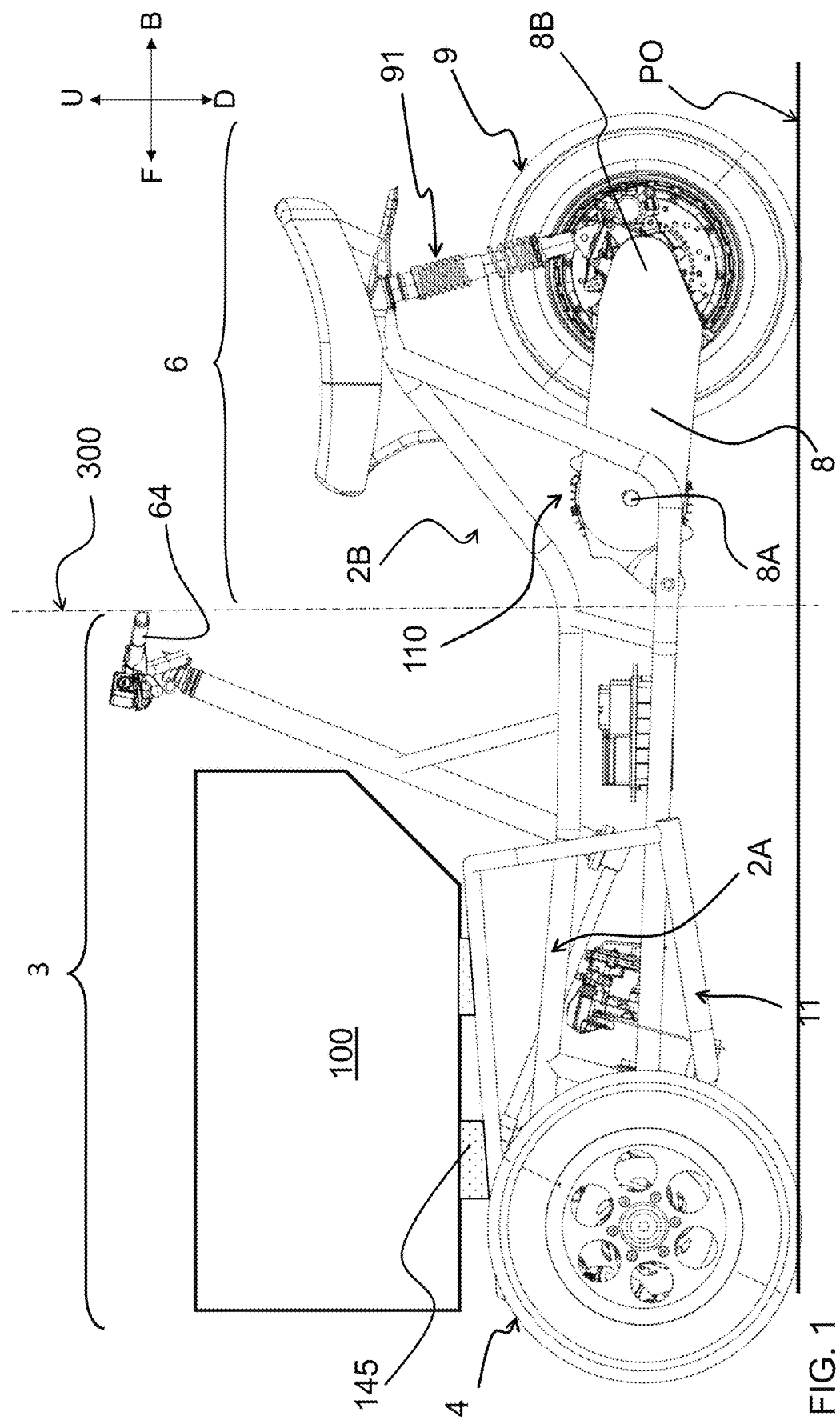
FIG. 1 is a view of a first possible embodiment of a vehicle according to the present invention.

The motor vehicle 1 comprises a frame 2A-2B, which extends mainly along the front-back direction F-B of the motor vehicle 1. The frame 2A-2B comprises a front part 2A and a rear part 2B, which support the forecarriage 3 and the rear end 6 of the motor vehicle 1, respectively. For the purposes of the present invention, the term "forecarriage 3" is meant to indicate the part of the motor vehicle 1 in front of a vertical reference plane 300 passing through the rearmost point of the handlebar 64 of the motor vehicle 1, i.e. the point of the handlebar 64 closer to the rear wheel 9 (see FIG. 1). The term "rear end 6", on the other hand, indicates the part of the motor vehicle 1 which is rearward to said reference plane 300.

The rear part 2B of the frame 2A-2B supports a powertrain 110 designed to generate the driving force useful for running the motor vehicle 1. For this purpose, the rear part 2B preferably comprises a right portion 81 and a left portion 81' (indicated in the embodiment of FIG. 7) preferably symmetrical with respect to the center plane A-A. These portions 81, 81' are connected in a transverse direction so as to define a space useful for positioning the powertrain 110 and/or for any devices useful for the operation thereof. The two portions 81, 81' support a saddle 77 at the top, while in the lower part they define a support portion 87 (indicated in FIG. 11) for the rider's feet in a position close to the front part 2A of the frame 2A-2B.

At the rear end 6, the motor vehicle 1 comprises a swingarm 8 hinged, at a first end 8A thereof, to the rear part 2B of the frame 2A-2B according to a per se known solution. At a second end 8B thereof the swingarm 8 support said at least one drive wheel 9. Shock absorber means 91 are arranged between the portions 81, 81' of the rear part 2B of the frame 2A-2B and the swingarm 8 according to a widely known principle.

The powertrain 110 comprises at least one motor 111 and at least one transmission unit 112 which operatively connects the motor 111 to the drive wheel 9. In general, the configuration of the powertrain 110 is not relevant to the purposes of the present invention. In fact, the motor 111 may be of the combustion or electric type and in any case have widely known configurations and operating principles. In one embodiment thereof, the powertrain 110 could be of the hybrid type, i.e., comprising both a combustion engine and an electric motor, which cooperate to drive the vehicle according to principles which are widely known per se.

Therefore, for the purposes of the present invention, also the configuration of the transmission unit 112 is not relevant, which can take a configuration known per se depending on the type of propulsion used (thermal, electric, hybrid). In general, a gearbox and a clutch may be provided between the engine and the gearbox according to a widely known principle. Transmission means may be provided downstream of the gearbox to transfer the torque generated by the engine to the drive wheel(s).

In the event that the propulsion is electric or of the hybrid type, the motor vehicle 1 is provided with an electric power supply unit adapted to power the electric motor so as to power the vehicle 1. Such power supply unit comprises one or more batteries and preferably also a battery recharging unit. Said power supply unit may include a recharging module, to manage the recharging operation, and at least one connection (electrical socket) for connecting the recharging module to an electrical source and/or to a suitable mains power supply. Also the configuration of the power supply unit is not relevant for the purposes of the present invention, as it may be of a known type.

According to a known principle, the batteries may be installed on the rear end 6 and therefore can be supported by the portions 81, 81' of the rear part 2B of the frame 2A-2B. However, according to a possible embodiment of the invention, indicated below; the batteries may be advantageously installed on the forecarriage 3 of the motor vehicle 1, as better indicated later on.

The forecarriage 3 of the motor vehicle 1 comprises a rolling four-bar linkage, generically indicated with the reference number 10. The four-bar linkage 10 comprises a lower cross member 11 (or first cross member 11) and an upper cross member 12 (or second cross member 12) both hinged to a portion 221 of the frame 2A-2B around first roll axes 101, 102, wherein said first roll axes 101, 102 are parallel to each other and lie on the center plane A-A indicated above. In particular, the roll axis 101 is a first lower roll axis and the roll axis 102 is a first upper roll axis. In particular, for the purposes of the invention, the terms "lower" and "upper" used to distinguish the two cross members 11, 12 of the four-bar linkage 10 refer only to the position of the points in which these cross members 11, 12 are hinged to the front part 2A of the frame 2A-2B, wherein this position is evaluated in the condition of a straight-wheeled vehicle and in the up-down direction U-D. Therefore, the terms "lower" and "upper" are independent of the geometric configuration of the cross members 11, 12 and of how they extend in space.

The four-bar linkage 10 further comprises a right upright 21 and a left upright 21' hinged to said cross members 11, 12 so as to rotate around corresponding second roll axes 211, 211', 221, 221'. In particular, each upright 21, 21' is hinged to the upper cross member 12 so as to rotate around an upper roll axis 212, 212' and is hinged to the lower cross member so as to rotate around a lower roll axis 211, 211'.

The two cross members 11, 12 extend transversely so that the upper roll axes 212, 212' are arranged symmetrically with respect to the center plane A-A. Similarly, the lower roll axes 211, 211' are also symmetrical with respect to the same plane A-A. This arrangement defines the four-bar linkage geometry necessary to support the rolling motion of the motor vehicle 1. The "symmetrical" position is evaluated in the condition of a straight-wheeled vehicle.

A respective support element 7, 7', which directly or indirectly supports a corresponding front wheel 4, 4', is associated with each of the uprights 21, 21' of the four-bar linkage 10. More precisely, a first support element, or right support element 7 is associated with the right upright 21 and directly or indirectly supports the right front wheel 4, while a second support element, or left support element 7' is associated to the left upright 21' and directly or indirectly supports the left front wheel 4'. The two support elements 7, 7' are free to rotate with respect to the corresponding upright 21, 21' around a corresponding steering axis 301, 301' of the corresponding front wheel 4, 4'. The two steering axes 301, 301' of the front wheels 4, 4' are parallel to each other and arranged symmetrically with respect to the center plane A-A.

With reference to the support elements 7, 7', the term "indirectly" indicates a condition whereby between the upright 21, 21' and the corresponding front wheel 4, 4' there are also other elements which, together with the support 7, 7', form a group of components which supports the wheel itself. A solution of this type is described later with reference to the description of FIG. 12A. Therefore, in general the term "support element" 7, 7' indicates a component which alone (directly) or with the mediation of other components (indirectly) supports a corresponding front wheel 4, 4'.

The forecarriage 3 also comprises a steering unit 60 for controlling the steering of the two front wheels 4, 4'. In particular, the steering unit 60 acts on the two support elements 7, 7' causing them to rotate around the corresponding steering axes 301, 301'. The steering unit 60 is activated by the rotation of the handlebar 64 of the motor vehicle 1, which is also part of the forecarriage 3.

The forecarriage 3 further comprises a suspension group operatively interposed between the front wheels 4, 4' and the four-bar linkage 10 in such a way as to allow a jolting movement, i.e. raising and lowering of the wheels with respect to the four-bar linkage itself. More precisely, the suspension group comprises right suspension means 71 operatively associated with the right front wheel 4, and left suspension means 71' operatively associated with the left front wheel 4'. The expression "operatively associated" means that the right and left suspension means are operatively interposed between the corresponding front wheel 4, 4' and the corresponding upright 21, 21' to allow the wheel itself to be raised and lowered (i.e. the jolting movement).

The right-hand suspension means 71 and the second left-hand suspension means 71' comprise at least one shock absorber element 75, 75' which dampens, according to a widely known principle, the relative movement of the corresponding front wheel 4, 4' with respect to the four-bar linkage 10. For the purposes of the present invention, the expression "shock absorber element" generically indicates a single damping component (i.e., which produces a viscous damping), or a single elastic component (spring), or the unit formed by an elastic component and by a damping component, coaxial or non coaxial to one another.

According to the present invention, the lower cross member 11 is shaped so as to extend along the front-rear direction FB of the motor vehicle 1 so as to support a further load, having a mass M, on at least three non-aligned points of the same lower cross member 11. The expression "load having a mass M" is meant to indicate generically any body, element, structure, block, device, group of components or devices, physically different from the lower cross member 11 and which is supported, in a fixed or removable manner, by the cross member itself. In the following description, the expression "longitudinal extension" referring to a cross member 11, 12 is meant to indicate the maximum distance between two points of the cross member, where this distance is considered along a direction parallel to the longitudinal direction F-B.

Advantageously, during the movement of the vehicle 1, the mass M moves integrally with the lower cross member 11 also during the rolling movement to which the motor vehicle 1 is subject. Due to the kinematics of the four-bar linkage 10, the lower cross member 11 and the mass M maintain approximately the same orientation with respect to a support plane PO of the motor vehicle 1, i.e. an orientation parallel to the support plane. If this is horizontal, the lower cross member 11 remains approximately horizontal, moving upwards or downwards (i.e. moving towards or away from the support surface) according to the inclination taken by the front wheels 4, 4'. The inclination of the latter is in fact transmitted only to the two uprights 21, 21' of the four-bar linkage 10. This condition is strictly respected in the case in which the center of each wheel falls on the respective steering axis 301 and 301'. Otherwise, the lower cross member 11 tilts slightly with respect to the direction parallel to the support plane PO.

As explained above, the mass M of the additional load supported by the cross member 11 is therefore not subject to rotations around longitudinal axes, except to a minimum extent if the center of the front wheels 4, 4' are not lying on the respective steered wheel axis 301, 301', since the lower cross member 11 is free to rotate with respect to the front part 2A of the frame 2A-2B. Therefore, the presence of an additional mass M in the forecarriage 3 actually leads to an advantageous increase in the weight of the forecarriage itself and therefore greatly increases the stability of the motor vehicle 1 already provided by the presence of two front wheels 4, 4'.

As better described hereafter, the load supported by the lower cross member 11 may be a "loading structure", meaning with this expression a set of components or groups of components which as a whole permanently or temporarily support and/or house goods, devices, apparatuses or more generally "objects" even of different weights and dimensions. In a possible embodiment, such loading structure (indicated generically with reference numeral 100) may take a "compartment" configuration, that is, such as to delimit a space adapted to fully or partially housing said "objects". According to a possible embodiment, the loading structure 100 is also configured for transporting people and/or animals. Basically, in the motor vehicle 1 according to the invention it is possible to transport people in the forecarriage 3.

In the case of the transport of goods, the compartment-shaped loading structure may be of the "container" type, that is, substantially consisting of a predominantly closed structure, open at the top or with an upper part that can be opened, to allow access to the internal space. Hereinafter, the terms "compartment" and "loading structure" are used interchangeably and in the figures, they are both indicated with reference numeral 100.

On the other hand, in the case of transport for passengers, the compartment 100 could be open at the top and/or laterally to allow access to the seats. In this case, during the use of the motor vehicle 1, the mass M supported by the lower cross member 11 is defined by the mass of the compartment 100 and the mass of what is supported and/or housed inside the compartment itself, regardless of its nature (objects or passengers). Therefore, such mass M may vary according to the operating conditions of the motor vehicle 1.

Overall, the presence of a load compartment 100 supported by the lower cross member 11 of the four-bar linkage 10 configures a "front loading area" in the forecarriage 3 of the motor vehicle 1. Overall, compared to rolling and traditional motor vehicles, such "loading area" distinctly increases the load capacity of goods and/or people. For this purpose, the longitudinal extension of the forecarriage 3 may also be distinctly greater than what has been proposed up to now for rolling motor vehicles. Furthermore, as further specified below; the longitudinal extension of the forecarriage 3 may also be greater than that of the rear end 6.

According to embodiments better described below; irrespective of whether or not a load compartment 100 is present, the additional load supported by the lower cross member 11 may also include devices and/or elements designed to allow the powertrain 110 to function. In particular, if the envisaged propulsion is completely electric or hybrid, the lower cross member 11 may be advantageously exploited to directly or indirectly support supply batteries B, B' of the electric motor 111.

Basically, differently from known solutions, in which the batteries are supported only in the rear end 6, in the motor vehicle 1 according to the invention they may also be placed in the forecarriage 3. Alternatively, the forecarriage 3 may be used to place a first plurality of batteries (or a first battery), while a second plurality of batteries (or a second battery) may in any case be installed in the rear end 6. Overall, with respect to a traditional rolling motor vehicle, it is therefore possible to increase the number of batteries on board the motor vehicle 1 and consequently the running autonomy of the same.

As better indicated below; the batteries B-B' are placed in such a way as to be symmetrical with respect to the center plane A-A. Preferably, they are housed in battery holder supports connected, directly or through interface means, to the lower cross member 11. Preferably, the batteries B-B' are of the removable type to allow extraction and subsequent insertion into the respective supports. In a possible embodiment, the motor vehicle 1 could comprise devices for moving the battery supports B-B', configured to move the same between a retracted position and an extracted position with respect to the front part 2A of the frame 2A-2B of the vehicle, where in the extracted position, the extraction and/or insertion of the batteries B-B' in the support are particularly simple.

Figure 2:
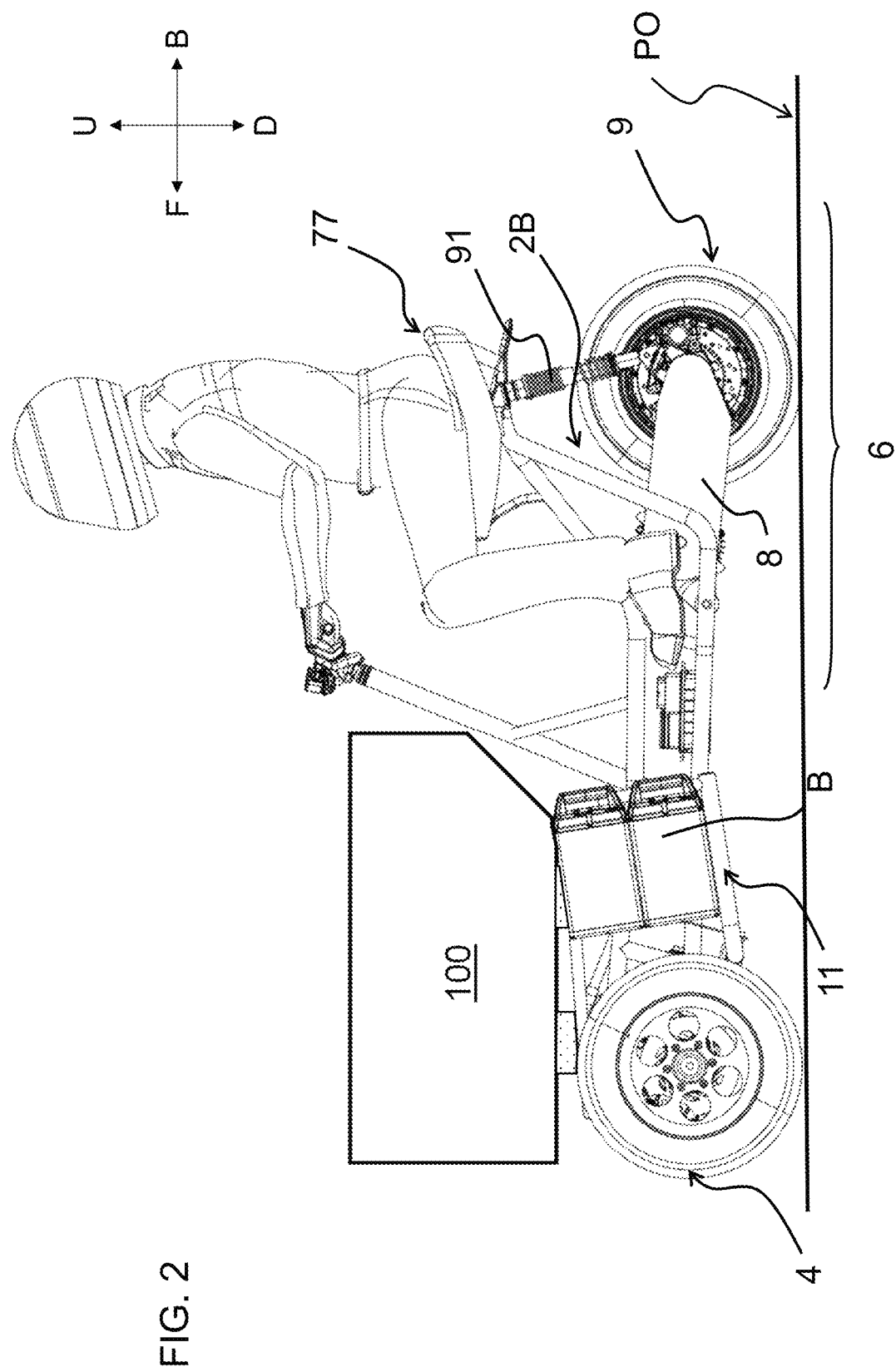
FIGS. 2 and 3 are a side view and a front view, respectively, of a second possible embodiment of a vehicle according to the present invention.

According to an embodiment shown in FIGS. 2 and 3, in the forecarriage 3, the motor vehicle 1 comprises a plurality of electric batteries B-B' and at the same time also a compartment 100 with the aforementioned transport purposes. The masses of the batteries B-B' and of the compartment 100 are supported by the lower cross member 11, in accordance with the purposes of the invention. In this configuration, the possible electric or hybrid propulsion, i.e. with zero emissions, makes the motor vehicle 1 particularly suitable for the transport of goods in urban areas.

FIGS. 4-4A to 6-6A are schematic views relating to possible, and therefore non-exclusive, embodiments of the four-bar linkage 10 of a vehicle 1 according to the invention. In particular, in these embodiments, it is possible to observe different configurations of the first cross member 11 which, according to the principles of the present invention, also extends in the longitudinal direction for the purposes indicated above. In the aforementioned FIGS. 4-4A to 6-6A, the additional load supported by the first cross member 11 has been schematized in the shape of a weight indicated with the letter M to indicate the mass thereof.

Figure 4A:
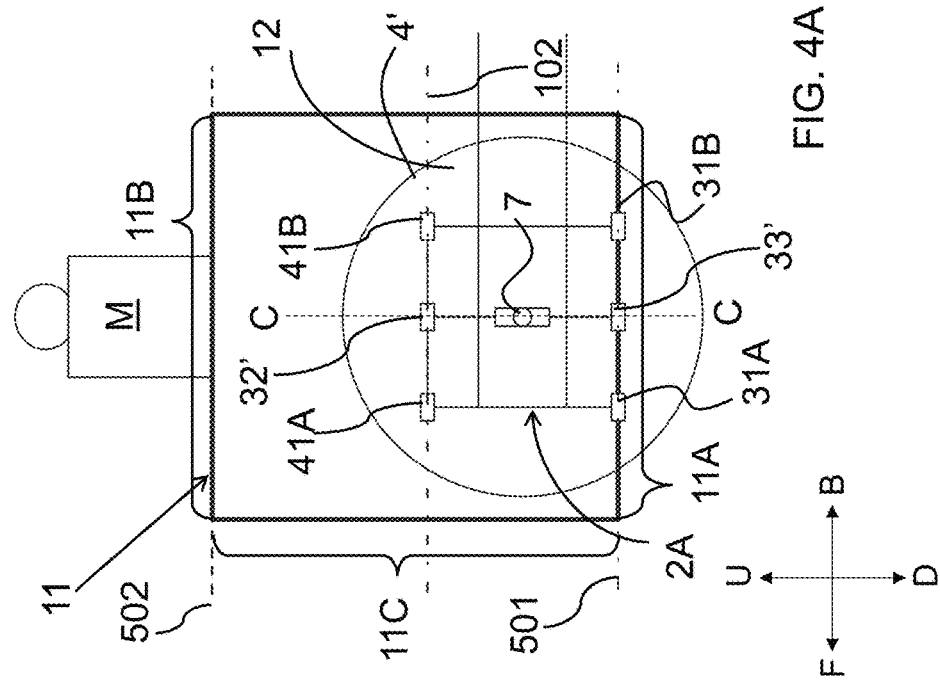
FIGS. 4 and 4A are a perspective view and a side view, respectively, of a first possible embodiment of a rolling four-bar linkage of a motor vehicle according to the present invention.
Figure 4:
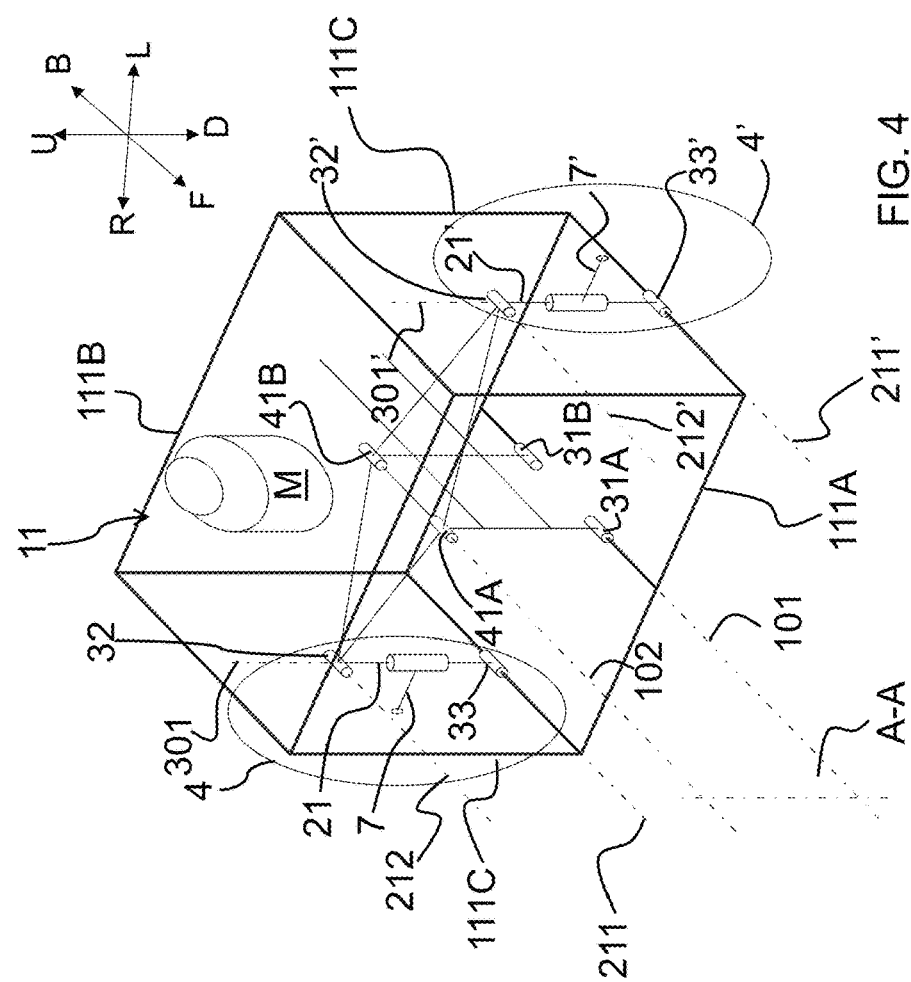
Figure 4C:
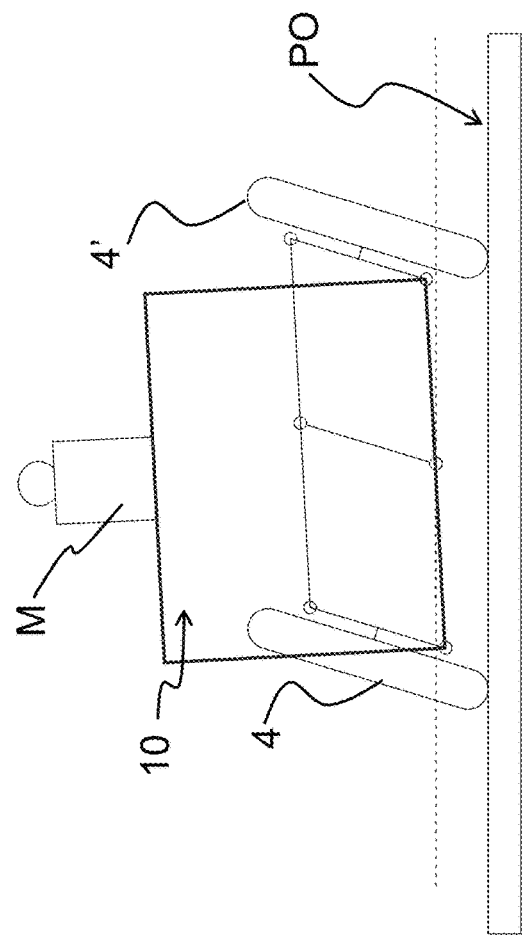
FIGS. 4B and 4C are schematic front views illustrating the transverse movement undergone by the load when the vehicle of FIGS. 4, 4A tilts.
Figure 4B:
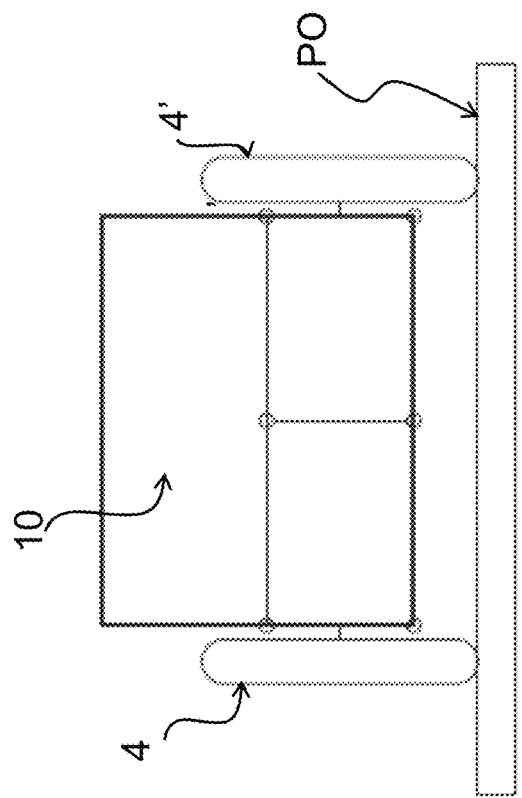

Before describing in detail the kinematic structure of the rolling four-bar linkages in the three embodiments of FIGS. 4-4A, 5-5A and 6-6A, the following should be noted. With reference to FIGS. 4-4A, in the following FIGS. 4B and 4C a schematic front view of the four-bar linkage 10 and of the front steered wheels 4, 4' is shown. In FIG. 4B, the vehicle is in an upright position, i.e. with a roll angle equal to zero. In FIG. 4C, the vehicle is inclined with a certain roll angle. The load M follows the movement of the lower cross member, with a lateral translation (i.e. in the right-left direction) which is much smaller than the translation in the same direction of the upper cross member of the rolling four-bar linkage 10. This is because the lower cross member is located at a lower level, and closer to the vehicle roll axis, which lies on the support surface of the vehicle. The roll axis of the motor vehicle is defined by the intersection between the vertical median plane of the motor vehicle and the support plane of the motor vehicle.

From these figures, one can clearly understand the advantage of having a lower cross member that projects upwards to define a load support surface, which is at a higher level than the upper cross member.

In the specific case, the steering axes are slightly spaced from the centers of the two front wheels 4, 4' and therefore, by performing the rolling movement, the four-bar linkage 10 undergoes a deformation which involves a very limited, but not zero, variation of the inclination of the upper and lower cross members with respect to the support surface PO. This inclination is disappears if the steering axes pass through the centers of the front wheels 4, 4'.

As may be seen from the aforementioned figures, preferably, the lower cross member 11 has a greater longitudinal extension than the upper cross member 12: this extension is evaluated on a lateral section plane (for example the plane of FIG. 1) and in the absence of roll, i.e. with the center plane A-A coinciding with the reference plane PVL (condition in FIGS. 3 and 3A).

According to an embodiment, shown in FIGS. 4-4A and 5-5A, the lower cross member 11 is hinged to the front part 2A of the frame 2A-2B through two first longitudinal hinges 31A, 31B which configure the first longitudinal axis 101 defined above. In particular, the two first longitudinal hinges 31A, 31B are offset longitudinally, with respect to a lateral observation plane (FIGS. 4A-5A). Advantageously, this solution ensures a correct structural connection to the front part 2A of the frame 2A-2B and leads to the possibility of using relatively small hinges and at the same time limiting the overall dimensions and dimensions of the elements defining the lower cross member 11 and the front part 2A of frame 2A-2B.

In fact, while falling within the scope of the present invention, the use of a single hinge would result in a substantially "cantilever" connection of the lower cross member 11 to the front part 2A of the frame 2A-2B and therefore would imply the need to increase the size of the hinge. Compared to the solution with more hinges, the use of a "single hinge" places more limitations to the possible longitudinal dimension of the lower cross member 11, unless a double connection hinge is used between the uprights 21, 21' and the lower cross member 11, as shown in the embodiment shown in FIGS. 6 and 6A and described below:

In the schematics shown in FIGS. 4-4A and 5-5A, the upper cross member 12 is also hinged to the front part 2A of the frame 2A-2B through two longitudinal hinges 41A, 41B (hereinafter referred to as second hinges 41A, 41B), which in combination form the second longitudinal axis 102 indicated above. Preferably, each of the two first hinges 31A, 31B defining the first longitudinal axis 101 is arranged in a position substantially below that of one of the second hinges 41A, 41B defining the second longitudinal axis 102. This position is evaluated with respect to a side view of the motor vehicle 1 (for example according to the plane of FIG. 2).

With reference again to the schematic shown in FIG. 3B, the upper cross member 12, extending longitudinally, may also be used to support a further mass MI, different from the mass M supported by the lower cross member 11. While driving, this hypothetical additional mass MI would follow the movements of the upper cross member 12 always maintaining approximately the same orientation with respect to the support plane PO (or strictly the same orientation if the centers of the wheels 4, 4' lie on the steering axes 301, 301'), that is, without being subjected to rotations around longitudinal axes, or undergoing minor rotations. However, with respect to that supported by the lower cross member 11, this additional mass MI would be subject to greater transverse displacements due to the kinematics of the four-bar linkage 10, which requires that the pivoting motion in the transverse direction of the upper cross member 12 is in any case greater than that of the lower cross member 11. Therefore, to accommodate the different transverse displacements, said additional mass MI must be physically separated from the mass M supported by the lower cross member 11.

In the possible embodiment schematically shown in FIGS. 4 and 4A, the first cross member 11 has a symmetrical configuration with respect to the center plane A-A considered in the absence of roll. In particular, the first cross member 11 has a substantially three-dimensional configuration extending not only transversely and longitudinally (i.e., according to the directions F-B and R-L), but also above, i.e., according to the up-down direction U-D (the extensions in the different directions are considered in the condition of straight-wheeled vehicle). In particular, according to this embodiment, the first cross member 11 comprises a lower portion 11A and an upper portion 11B, which extend below and above the second cross member 12, respectively. The upper portion 11B overrides the second cross member 12 when seen in a lateral observation plane (FIG. 4A). The two portions 11A, 11B indicated are connected by a connecting portion 11C, which confers the three-dimensionality to the lower cross member 11.

Each of the portions 11A, 11B, 11C of the lower cross member 11 is formed by several components 111A, 111B, 111C oriented differently in space. The lower portion 11A is hinged to the two uprights 21, 21' of the four-bar linkage 10 through corresponding hinges 33, 33' that are arranged symmetrically with respect to the central plane A-A. Through the connecting portion 11C, the upper portion 11B is rigidly connected to the lower portion 11A, without being connected to the two uprights 21, 21'.

Still referring to FIGS. 4 and 4A, a corresponding extension plane 501, 502 is identified for the lower portion 11A and for the upper portion 11B. Such extension planes 501, 502, as visible in FIG. 4A, are substantially parallel, but they could also be non-parallel, as will appear later in the description of the embodiment shown in FIGS. 8 and 9.

Still referring to FIGS. 4 and 4A, a "steering plane" C-C (indicated in FIG. 4A) is identified, whereby this expression is meant to indicate the plane containing the steering axes 301, 301' or the rotation axes of each support element 7, 7' with respect to the corresponding upright 21, 21' of the four-bar linkage 10. The two cross members 11, 12 have a configuration, which is symmetrical with respect to such steering plane C-C, as visible from the side view in FIG. 4A. For each of the cross members 11, 12 it is therefore possible to identify a front part and a rear part, i.e., a part which extends, along the longitudinal direction F-B, in front and behind with respect to the steering plane C-C.

With reference to FIG. 4A, according to the invention the mass M of the load is supported by the lower cross member 11, more precisely by the upper portion 11B of the lower cross member 11, as schematically shown in FIG. 4A.

The embodiment shown in FIGS. 5, 5A differs from that of FIGS. 4 and 4A substantially due to a different shape of the cross members 11, 12. Both the cross members 11, 12 are connected to the front part 2A of the frame 2A-2B by means of a pair of longitudinally offset hinges 31A, 31B-41A, 41B, according to a principle already described above. The upper cross member 12 extends substantially behind the steering plane C-C defined above containing the steering axes 301, 301'. On the other hand, the lower cross member 11 has a front part 120A and a rear part 120B evaluated with respect to the same plane. In particular, in the illustrated embodiment the front part 120A has a greater longitudinal extension than the rear part 120B (as shown in FIG. 5A).

Still referring to FIGS. 5, 5A, also in this embodiment the lower cross member 11 has a three-dimensional shape with a lattice extension, including a first portion 11A', which extends over a main plane 501', and a second portion 11A", which extends below such main plane 501'. The first portion 11A' is defined by a plurality of components 111A' (shown in FIG. 5), for example with a tubular profile, connected to one another in such a way as to identify said main plane 501' and on which the mass load M is supported and constrained (shown in FIG. 5A). The second portion 11A", on the other hand, has a pyramidal extension towards the support plane PO of the motor vehicle 1, comprising a plurality of components 111A" connected in a common vertex (see again FIG. 5A).

Figure 5C:
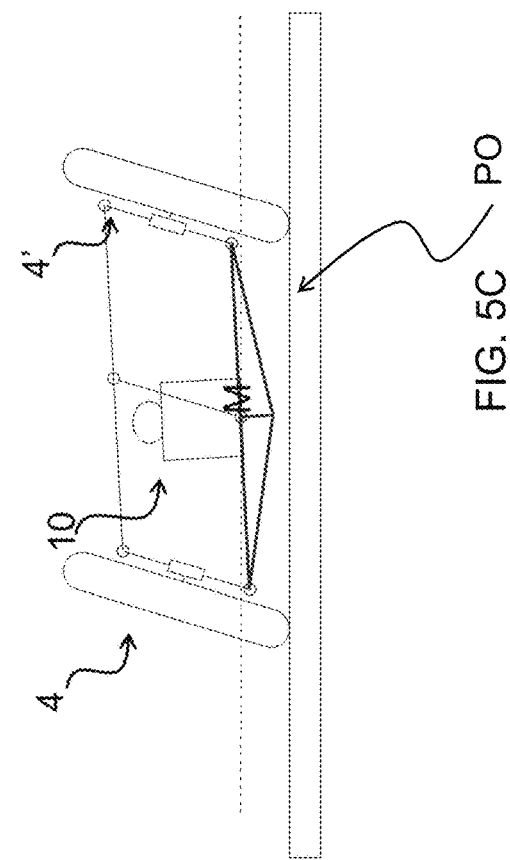
FIGS. 5B and 5C are schematic front views illustrating the transverse movement undergone by the load when the vehicle of FIGS. 5, 5A tilts.
Figure 5B:
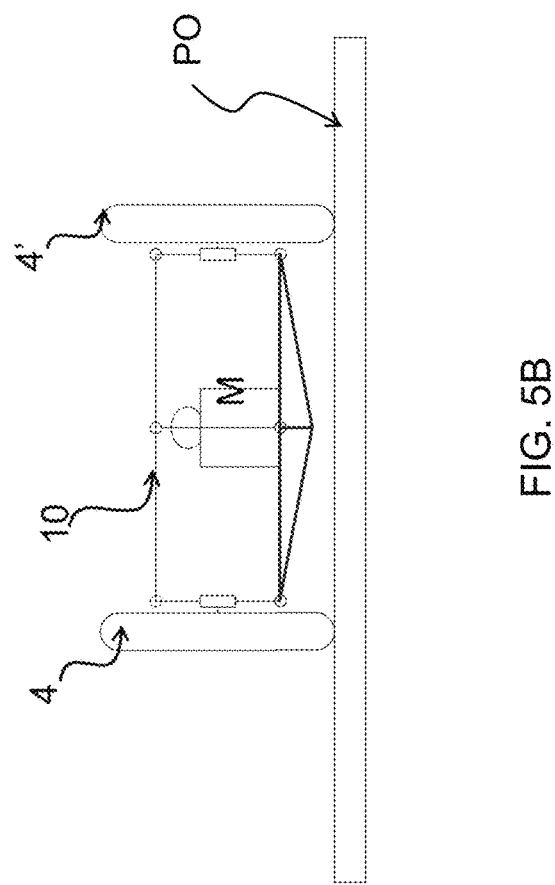

FIGS. 5B and 5C show; similarly to FIGS. 4B and 4C described above, a schematic front view of the four-bar linkage 10 and of the front steered wheels 4, 4' of the embodiment of FIGS. 5, 5A. In FIG. 5B, the vehicle is in an upright position, i.e., with a roll angle equal to zero. In FIG. 5C, the vehicle is inclined with a certain roll angle. The load M follows the movement of the lower cross member, with a lateral translation (i.e., in the right-left direction) much smaller than the translation in the same direction of the upper cross member of the rolling four-bar linkage 10. This is because the lower cross member is located at a lower height, and closer to the roll axis of the motor vehicle, which lies on the support surface of the motor vehicle.

In the specific case, the steering axes are slightly spaced from the centers of the two front wheels 4, 4' and therefore, by carrying out the rolling movement, the four-bar linkage 10 undergoes a deformation which involves a very limited, but not zero, variation of the inclination of the upper and lower cross members with respect to the support surface PO. This inclination is cancelled out if the steering axes pass through the centers of the front wheels 4, 4'.

Numerous variations could also be contemplated for this embodiment. The rear portion 120B of the lower cross member 11, for example, may have a longitudinal extension greater than or equal to the front portion 120A. The rear portion 120B may also have the same conformation as the upper cross member 12. In another variant, the lower cross member 11 may have a symmetrical conformation with respect to the reference plane C-C defined above. In a further variant, the upper cross member 12 may also extend in front of the reference plane C-C, extending symmetrically or non-symmetrically with respect thereto.

Figure 6A:
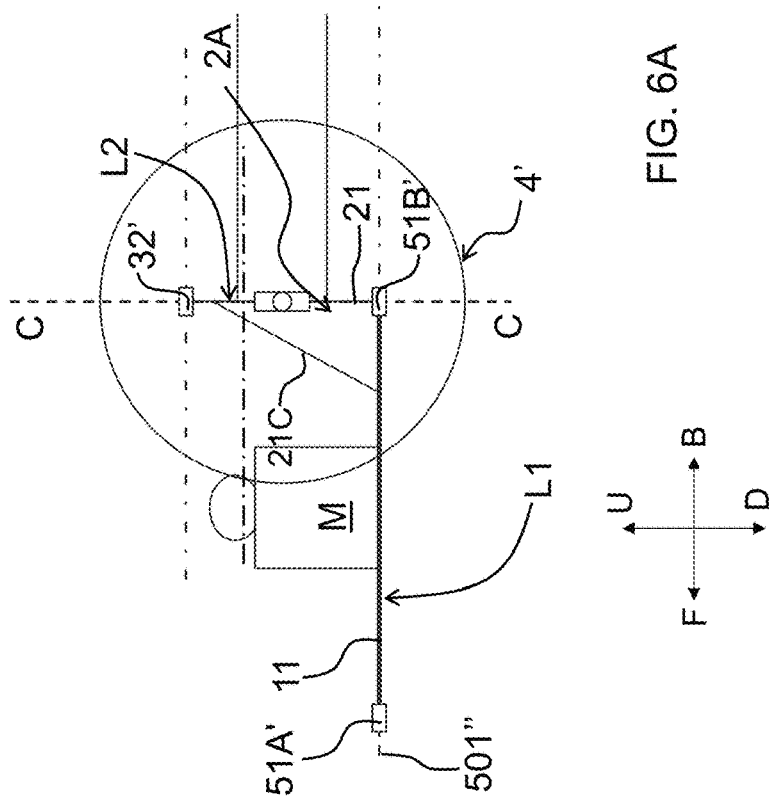
FIGS. 6 and 6A are a perspective view and a side view, respectively, of a third possible embodiment of a rolling four-bar linkage of a motor vehicle according to the present invention.
Figure 6:
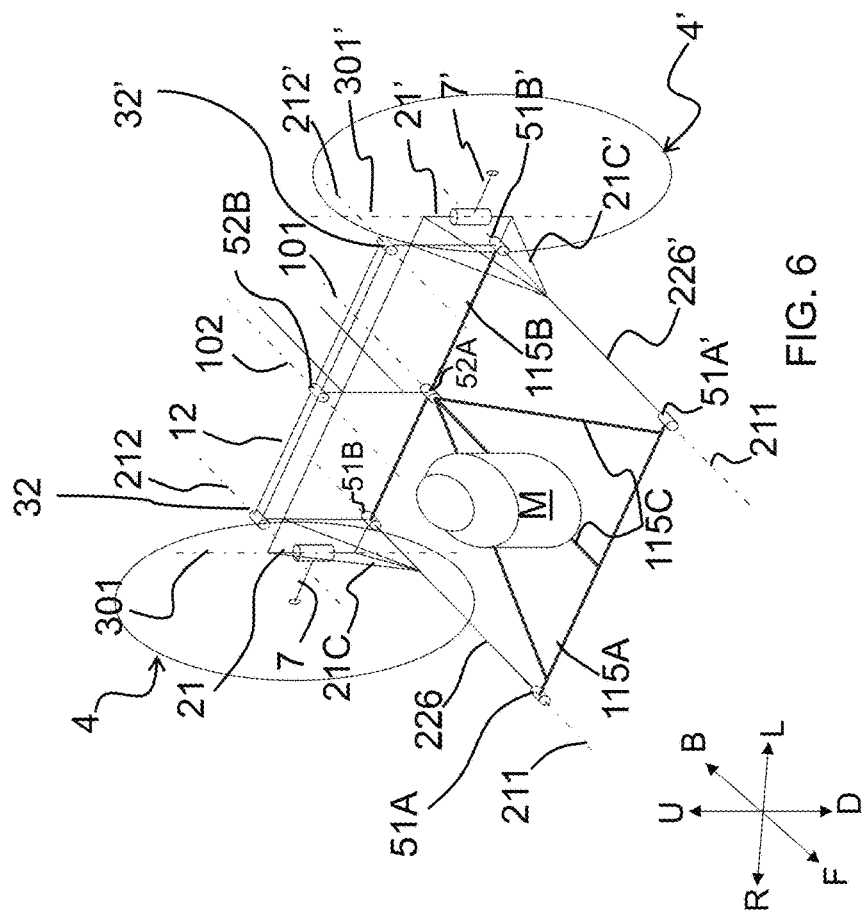

FIGS. 6 and 6A refer to a further modified embodiment in which the uprights 21, 21' have a different configuration from that schematized in the embodiments described above. In particular, in this embodiment, the uprights 21, 21' also extend in the longitudinal direction (direction F-B) as well as according to the direction of the corresponding steering axes 301, 301' (direction U-D). The lower cross member 11 is hinged to each upright 21, 21' through a corresponding pair of hinges 51A, 51B-51A', 51B', which are offset in the longitudinal direction. The same lower cross member 11 is instead hinged to the front part 2A of the frame 2A-2B through a single hinge 52A. In this embodiment, the upper cross member 12 has a configuration which substantially corresponds to that typically provided in rolling vehicles of known type. In fact, the upper cross member 12 extends substantially only in the transverse direction and only one hinge 52B is provided for the connection thereof to the front part 2A of the frame 2A-2B.

Still referring to FIGS. 6 and 6A, the lower cross member 11 extends substantially on a main plane 501" comprising at least two transverse elements 115A-115B, which extend in a transverse direction and which are both hinged to the uprights 21, 21'. In particular, at least a first transverse element 115A is arranged at the front and at a distance from the reference plane C-C defined above. A second transverse element 115B is arranged in proximity to the same reference plane C-C. Three other elements 115C of the lower cross member 11 connect the two transverse elements and extend on the main plane 501" according to a triangular arrangement, converging in a common vertex on the center line A-A at the medial point of the second transverse element 115B. At this point the first cross member 11 is connected to the front part 2A of the frame 2A-2B.

As may be seen in FIG. 6A, in this third embodiment the two uprights 21, 21' have a substantially L-shaped configuration, preferably with a lattice portion 21C, 21C' defined at the connection area between the two sides of the L. In the case illustrated, the longer side L1 of the L-shape extends mainly in the longitudinal direction, while the shorter side L2 extends in the direction of the corresponding steering axes 301, 301'. As visible from the perspective view of FIG. 6, for each upright 21, 21', the lattice portion 21C, 21C' comprises a plurality of components connected according to a pyramidal configuration converging in a longitudinal direction towards a component 226, 226' defining said longer side L1.

Figure 6C:
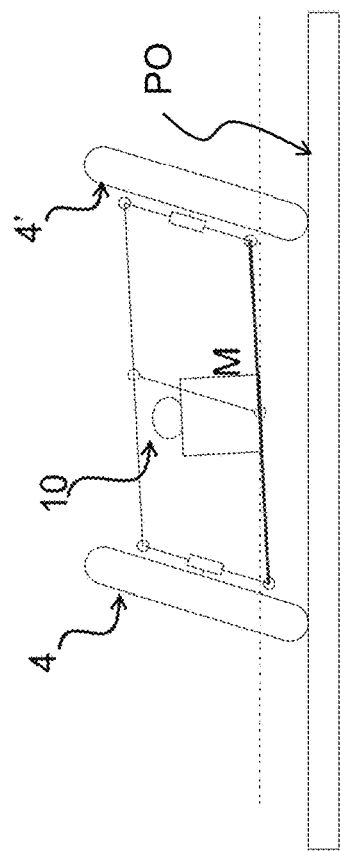
FIGS. 6B and 6C are schematic front views illustrating the transverse movement undergone by the load when the vehicle of FIGS. 6, 6A tilts.
Figure 6B:
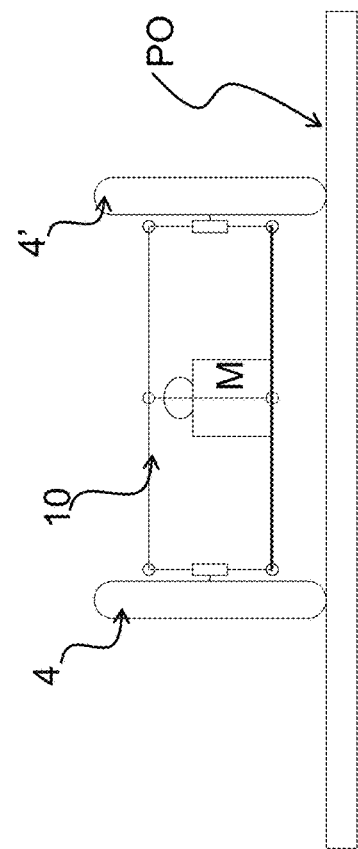

FIGS. 6B and 6C show, similarly to FIGS. 4B, 4C and 5A, 5B, described above, a schematic front view of the four-bar linkage 10 and of the front steered wheels 4, 4' of the embodiment of FIGS. 6, 6A. In FIG. 6B, the vehicle is in an upright position, i.e., with a roll angle equal to zero. In FIG. 6C, the vehicle is inclined with a certain roll angle. The load M follows the movement of the lower cross member, with a lateral translation (i.e., in the right-left direction) much smaller than the translation in the same direction of the upper cross member of the rolling four-bar linkage 10.

Also in this case, the steering axes are slightly spaced from the centers of the two front wheels 4, 4' and therefore, by carrying out the rolling movement, the four-bar linkage 10 undergoes a deformation which involves a very limited, but not zero, variation of the inclination of the upper and lower cross members with respect to the support surface PO. This inclination is cancelled out if the steering axes pass through the centers of the front wheels 4, 4'.

Also for this third embodiment, different configurations may be provided. In particular, the conformation of the uprights 21, 21' could be different from the one shown (for example, the orientation of the L could be varied so that the shorter side extends in the longitudinal direction). The conformation of the first cross member 11 may also be different: in fact, instead of extending substantially only on a plane, it may have, for example, a three-dimensional configuration, according to what is contemplated for the other embodiments. Furthermore, the lower cross member 11 may also extend backwards, therefore not only in front of the reference plane C-C. A different conformation may also be provided for the upper cross member 12, for example such as to include a portion which also extends in the longitudinal direction.

Those described above with reference to FIGS. 4-4A to 6-6A are to be considered exclusively as possible, and therefore not exclusive, embodiments. In particular, the configuration of the rolling four-bar linkage 10 may vary as a function of the load (and therefore of the value of the mass M), which must be supported by the first cross member 11. This configuration may also depend on the dimensions (in terms of length and track) provided for the motor vehicle 1. Basically, the structure of the two cross members 11, 12, of the two uprights 21, 21, of the front part 2A of the frame 2A-2B and more generally of the forecarriage 3 may vary according to the loads to be supported and the space available.

In this regard, FIGS. 7 to 12 refer to a possible embodiment of the invention and in particular of the four-bar linkage 10. In particular, FIG. 8 shows the configuration of the lower cross member 11, while FIG. 9 shows the configuration of both cross members 11, 12 without the connections to the front part 2A of the frame 2A-2B and to the uprights 21, 21'. FIGS. 7, 10, 11 and 12 are instead seen from different observation points of the forecarriage 3 without the masses M, MI supported by the cross members 11, 12.

With reference to FIG. 8, the lower cross member 11 has a configuration conceptually referable to that of FIGS. 4-4A. In fact, the lower cross member 11 has a three-dimensional configuration, in which including a lower portion 11A and an upper portion 11B supported with respect to the lower portion 11A by a connecting portion 11C. As may be seen from FIG. 9, the upper cross member 12 remains substantially included between the lower portion 11A and the upper portion 11B of the lower cross member 11, at least with respect to a lateral observation plane.

Still referring to FIGS. 8 and 9, the first cross member 11 has a symmetrical conformation with respect to the center plane AA containing the first longitudinal axis 101 and the second longitudinal axis 102 defined above and considered in the absence of roll. As shown, preferably, the first cross member 11 has a tubular component structure, but these components could also consist of profiles of different shapes and configurations. Furthermore, the components of the first cross member 11 could all be made of the same material or of different materials.

In this case, in FIG. 8, the upper portion 11B is defined by a plurality of elements 111B connected to one another so that the same extends on a plane 502. In particular, the upper portion 11B has a substantially trapezoidal shape, when seen on its extension plane 502. The lower portion 11A comprises a first region 11A-1 and a second region 11A-2 connected to each other and configured so as to extend on incident planes 501-A, 501-B. In particular, the first region 11A-1 has a flattened hexagon shape, seen on the extension plane 501-A thereof. The second region 11A-2, on the other hand, has a U-shaped conformation, seen on the extension plane 501-B thereof. In accordance with what has already been indicated above, the two regions extend symmetrically with respect to the center plane A-A.

The connecting portion 11C comprises a plurality of components 111C-A, 111C-B which space the two portions 11A, 11B apart. In particular, two front components 111C-A and two rear components 111C-B are provided, which connect the first region 11A-1 and the second region 11A-2, respectively, to the upper portion 11B. In particular, these components establish the distance and orientation of the planes 501-A, 501-B, 502, on which the portions 11A-11B of the lower cross member 11 extend. In detail, in the illustrated embodiment, the extension plane 502 of the upper portion 11B is incident on the planes 501-A, 501-B, on which the two regions 11A-1, 11A-2 of the lower portion 11A extend.

Figure 10:
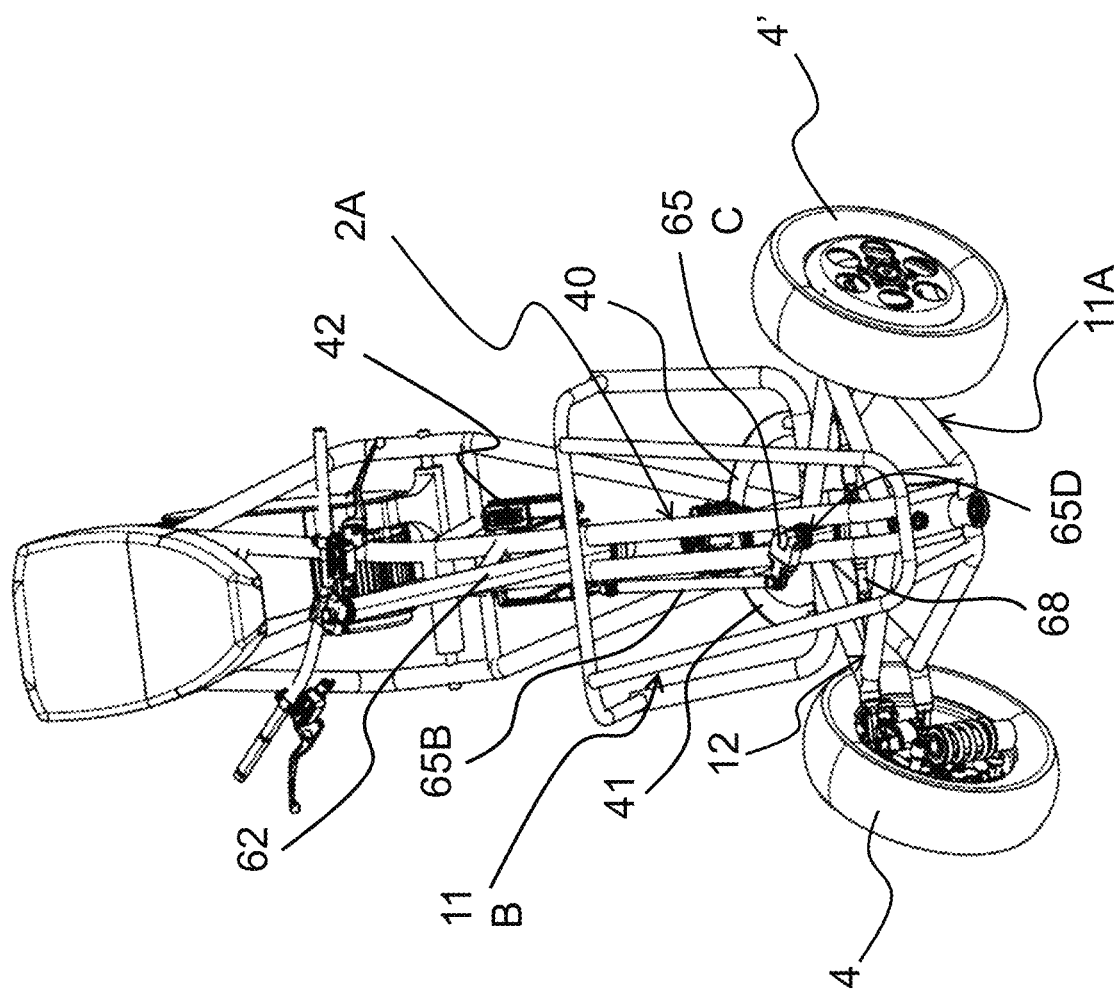
FIGS. 10, 11 and 12 are further perspective views, from different points of view, of the motor vehicle of FIG. 7.
Figure 11:
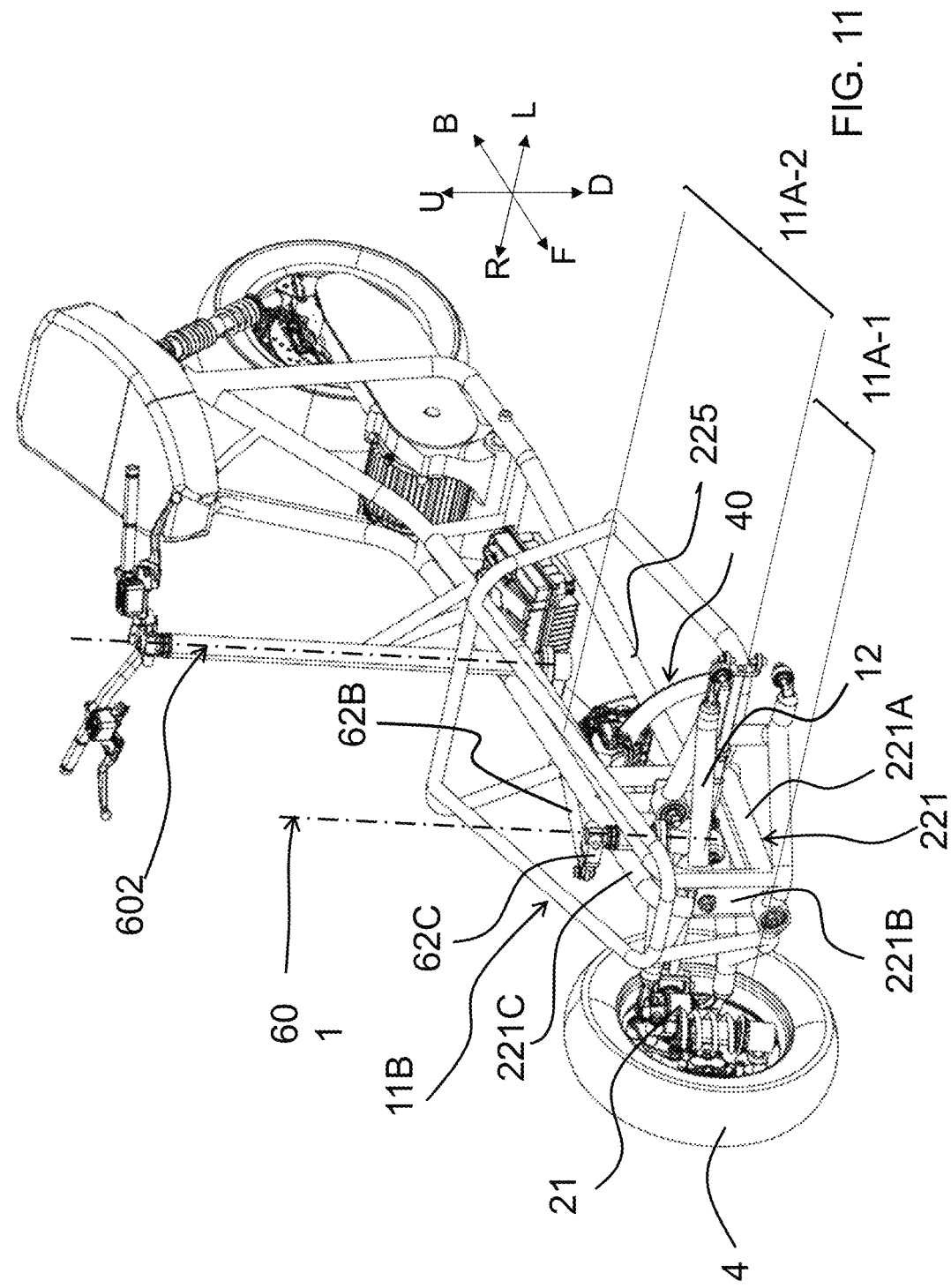
Figure 12:
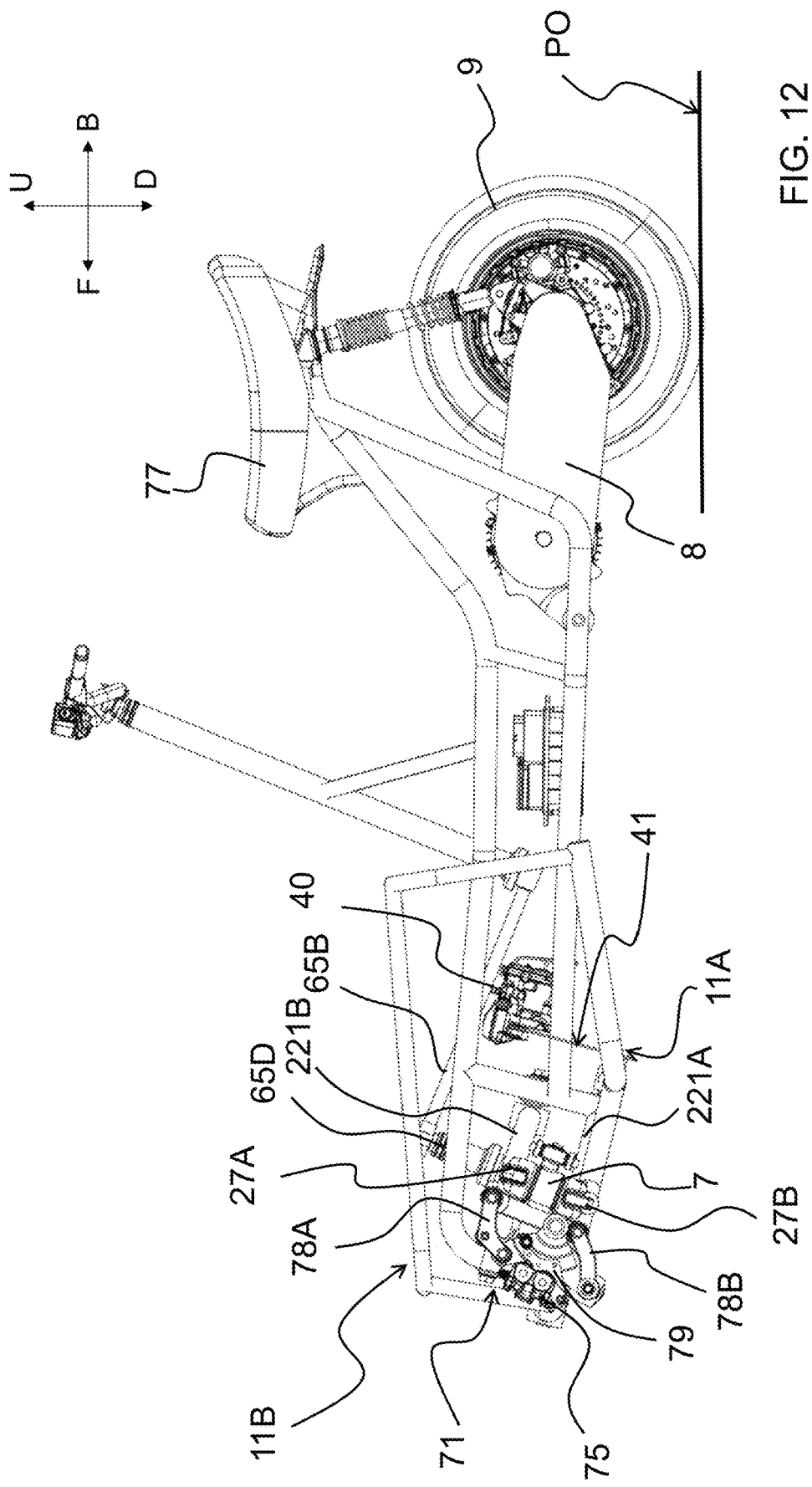

FIGS. 10 to 12 show a possible embodiment of the front part 2A of the frame 2A-2B adapted to support in a rotatable manner the two cross members 11, 12 described above in the description of FIGS. 8 and 9. The two cross members 11, 12 are hinged in an end part 221 defining a supporting frame. In a side view of the vehicle, such frame is substantially rectangular in shape and comprises a base portion 221A, wherefrom two longitudinally spaced supports 221B extend (see in particular FIG. 11). A cap portion 221C completes the frame by extending in a spaced position and overlying the base 221A. The front part 2A of the frame 2A-2B then comprises components 225, with mainly longitudinal extension, which connect the end part 221 to the rear part 2B of the frame 2A-2B.

With reference in particular to FIG. 11, the lower cross member 11 is hinged to the two supports 221B at the base portion 221A, while the upper cross member 12 is hinged to the two supports 221B in a position comprised between the cap portion 221C and the base portion 221A of said frame. For both cross members 11, 12, the connection to the end part 221 provides two connecting hinges, one for each support 221B, offset longitudinally, according to a solution substantially similar to the one described above in the description of FIGS. 4 and 4A. The two cross members 11, 12 emerge transversely (along the right-left direction R-L) from the two longitudinal sides of the end part 221 (frame) towards the front wheels 4, 4'. The end part 221 has a distinctly smaller transverse extension than that of the cross members themselves (see in particular FIG. 12).

FIGS. 10 to 12-12A show a possible embodiment of the suspension group provided between the uprights 21, 21' of the four-bar linkage 10 and the front wheels 4, 4'. FIG. 12 shows the group of components associated with the right front wheel 4, i.e., the right upright 21, the right support element 7 and the right suspension means 71, which indirectly connect the right support element 7 to the right wheel 4. FIG. 12A instead shows the group of components associated with the left front wheel 4', i.e., the left upright 21', the left support element 7' and the left suspension means 71'. The two groups of components are corresponding, that is, mirror images.

In particular, the technical solution shown in FIGS. 12 and 12A is known per se and corresponds to that described in the patent application WO 2020065577 in the name of the Applicant. In particular, each second upright 21, 21' is formed by two parts 27A-27B, 27A'-27B' coupled by means of a screw and each of which is defined by a fork-like body: An upper part 27A, 27A' is hinged to the upper cross member 12, while the lower part 27B, 27B' is hinged to the lower cross member 11 of the four-bar linkage. The support element 7, 7' is defined by a sleeve (hereinafter indicated with the same reference numeral 7, 7') mounted around the corresponding upright 21, 21' and indirectly connected to the body of the corresponding wheel 4, 4' through the corresponding suspension means 71, 71'. Overall, for each wheel 4, 4', the corresponding sleeve 7, 7' and the corresponding upright 21, 21' define the steering axis 301, 301' of the wheel itself.

As indicated above, for each wheel, the corresponding suspension means 71, 71' are interposed between the sleeve 7, 7' and the body of the corresponding front wheel 4, 4' so as to allow it to be lowered or raised with respect to the second upright 21, 21' and therefore with respect to the four-bar linkage 10. In the case shown in FIGS. 12 and 12A, the suspension means 71, 71' have a known configuration and conceptually corresponding to that disclosed in patent application WO2018/104906 in the name of the Applicant and shown in FIGS. 6a, 6b, 7 of the same. In fact, the suspension means 71, 71' have a substantially four-bar linkage structure defined by a spindle 79, 79', two cranks 78A-78B. 78A'-78B' and the corresponding support element 7, 7' (or sleeve). The spindle 79, 79' is connected to the corresponding wheel 4, 4' to allow it to rotate around its axis. A first crank 78A, 78A' is hinged above the spindle 79, 79' and the support element 7, 7'. Similarly, the second crank 78B, 78B' is hinged below the spindle 79, 79' and the corresponding support element 7, 7'. The suspension means 71, 71' comprise a shock absorber 75, 75' hinged between the spindle 79, 79' and the two cranks 78A-78B, 78A'-78B' so as to vary its extension (i.e., its state of compression) following the movement of the four-bar linkage suspension, where this movement is caused by the jolting movement, i.e., lifting and lowering, of the corresponding wheel 4, 4'.

For the purposes of the invention, the term spindle is meant to indicate the mechanical part of the motor vehicle designed to rotatably support the wheel. The spindle may therefore be a rotation pin rigidly connected to the suspensions and rotatably to the wheel or a rotation pin rigidly connected to the wheel and rotatably to the suspensions.

In the embodiment shown in the figures, the shock absorber 75, 75' is substantially external, remaining "visible" on the internal side of the corresponding wheel 4, 4', i.e., in the space between the wheel 4, 4' and the center line A-A. However, the shock absorber could also be "jacketed" in the wheel guide body according to the principle visible in FIGS. 3 and 4 of the aforementioned application WO2018/104906. In the same way, also the configuration of the sleeve 7, 7' could be different from that shown in FIGS. 12 and 12A being able, for example, to take one of the configurations again shown in patent application WO2018/104906.

In general, what is shown in FIGS. 11 to 12-12A is to be considered as a possible and therefore non-exclusive embodiment of the suspension group which may be implemented in a vehicle according to the present invention. In this regard, the suspension group could be made, for example, according to any of the embodiments described and/or shown in the aforementioned applications WO2018/104906 and WO2020/065577 or alternatively also in applications WO2018/007911, WO2018/172908, WO2017/115297, WO2017/021905, WO2017/021906, WO2017/115274, also in the name of the Applicant.

In alternative embodiments, but still falling within the scope of the present invention, for each side of the four-bar linkage 10, the suspension means 71, 71' could be at least partially integrated in the structure of the corresponding upright 21, 21'. In this regard, in a possible embodiment, for example, the uprights 21, 21' of the four-bar linkage 10, and more generally the suspension group, could be configured according to what is described and/or shown in patent applications WO2017/017639 and WO2017/017636 in the name of the Applicant. Basically, in these solutions, each upright 21, 21' is connected to the corresponding front wheel 4, 4' through the support element 7, 7' in the form of a spindle, wherewith the rotation pin of the wheel itself is associated. The spindle directly supports the corresponding wheel 4, 4' and is coupled to the respective upright 21, 21' so as to be free to rotate and translate with respect to the steering axis 301, 301' configured by the upright itself. A shock absorber is at least partially housed inside the upright 21, 21' and is connected at a first end to the upright and at a second end to the spindle, so as to allow the latter to move, together with the wheel, following the jolting movements thereof.

With reference to the aforementioned FIGS. 10 to 12, as indicated above, the forecarriage 3 comprises a steering unit 60 which operatively connects the handlebar 64 of the motor vehicle 1 to the support elements 7, 7' of the front wheels 4, 4'. In the illustrated embodiment, the steering unit 60 comprises a steering column 62 operated by the handlebar 64 and a lever mechanism, which operatively connects the steering column 62 to a steering bar 68. This latter comprises two opposite ends, each of which is connected to a corresponding support element 7, 7' of a respective front wheel 4, 4'. Preferably, this connection provides two degrees of freedom so as to allow the support element 7, 7' to move with respect to the corresponding end of the steering bar 68 (or vice versa) so as to accommodate the required steering and rolling movements, according to a principle known per se.

The lever mechanism has the function of transferring the rotation of the steering column 62 to the steering bar 68. The latter is arranged transversely through the end part 221A of the front part 2A of the frame 2A-2B in a position comprised between the second cross member 12 and the lower portion 11A of the first cross member 11. The steering rod 68 is supported by the end portion 221A through a joint 65D (shown in FIGS. 10 and 12). Such joint 65D transmits the movement of the lever mechanism to the steering bar 68 itself. The lever mechanism comprises three levers 65A, 65B, 65C arranged according to a parallelogram scheme, in which a first short lever 65A is integral in rotation with the steering column 52, a second short lever 65B is integral in rotation with said joint 65D and a third long lever 65C connects the two short levers 65A, 65B so that the rotation of the first short lever 65A is transferred to the second short lever 65B and therefore to the joint 65D.

The rotation of the joint 65D in turn causes a steering movement of the front wheels 4, 4', as may be seen by comparing FIGS. 10 and 11. In the condition of FIG. 11, the steering is substantially zero, while in the condition of FIG. 10 the two front wheels 4, 4' are steered to the left. In FIG. 11, the reference numeral 601 indicates the rotation axis of the joint 65D (and therefore of the second short lever 65B), while the reference numeral 602 indicates the rotation axis of the steering column 62 (and therefore of the first short lever 65A). The steering of the wheels 4, 4' to the left is obtained by an anti-clockwise rotation of the steering column 62 about its axis.

The lever mechanism 65A, 65B, 65C described above allows the motion to be transmitted between the two axes 601, 602 even if these are not parallel. This aspect is advantageous in that the position of the axis 602 of the steering column 62 is chosen on the basis of ergonomic criteria, while the position of the axis 601 is chosen on the basis of technical criteria related to the configuration and operation of the steering bar 68. The lever mechanism also allows optimally configuring the steering arms, multiplying or de-multiplying the steering action as a function of the weight on the forecarriage and therefore allows the rider to reduce or increase the force necessary to make the steering. Preferably, the lever mechanism 65A, 65B, 65C is configured to reduce the steering action, i.e. in such a way that in order to rotate the wheels by a predetermined angle, the driver must rotate the handlebar 64 by an angle greater than said predetermined angle.

Also in this case, the configuration of the steering unit 60 just described above and shown in the aforementioned figures is to be considered only as a possible, and therefore non-exclusive, embodiment. Therefore, the steering unit 60 could also be made according to one of the solutions and/or one of the principles described and/or shown, for example, in patent applications WO2017/115296, WO 2017/115274, WO2017/017636, WO2018/104862 and WO2018/172908 in the name of the Applicant.

Still referring to FIGS. 10 to 12, the forecarriage part 3 also comprises an anti-roll device 40 configured to block, when activated, the relative movement between the four-bar linkage 10 and the front part 2A of the frame 2A-2B. More precisely, in the case illustrated, the anti-roll device 40 comprises a structural element 41 substantially shaped like an arc of a circle and connected to the lower cross member 11 so as to be symmetrical with respect to the center plane A-A. The anti-roll device 40 also comprises a locking unit 42 integral with the front part 2A of the frame 2A-2B and selectively switchable between an intervention and non-intervention condition on the structural element 41. In the intervention condition (with stationary vehicle), the locking unit 42 prevents any movement of the first cross member 11 with respect to the front part 2A of the frame 2A-2B. On the contrary, in the non-intervention condition (i.e., while the motor vehicle 1 is running), the locking unit 42 does not place any constraint on the movement of the first cross member 11.

Also in this case, in the motor vehicle 1 according to the present invention, the anti-roll device 40 can have a configuration different from that shown in the figures and just described above. For example, if the suspension means (in particular the shock absorbers) are at least partially integrated in the structure of the uprights, the anti-roll device could have, by way of example only, one of the configurations described and/or shown in patent applications WO 2017/115293, WO 2017/115296, WO2017/115295 and WO 2017/115294 in the name of the Applicant. On the other hand, if the suspension means 71, 71' of the front wheels are interposed between the uprights and the wheels (i.e., according to a solution conceptually similar to that shown in the accompanying FIGS. 9 to 12A), then the anti-roll device could have other structures, such as for example those shown and/or described in patent applications WO 2018/116210, WO2018/116214, WO 2018/158743 and WO 2018/116211, again in the name of the Applicant.

Figures 13, 13A, 15:
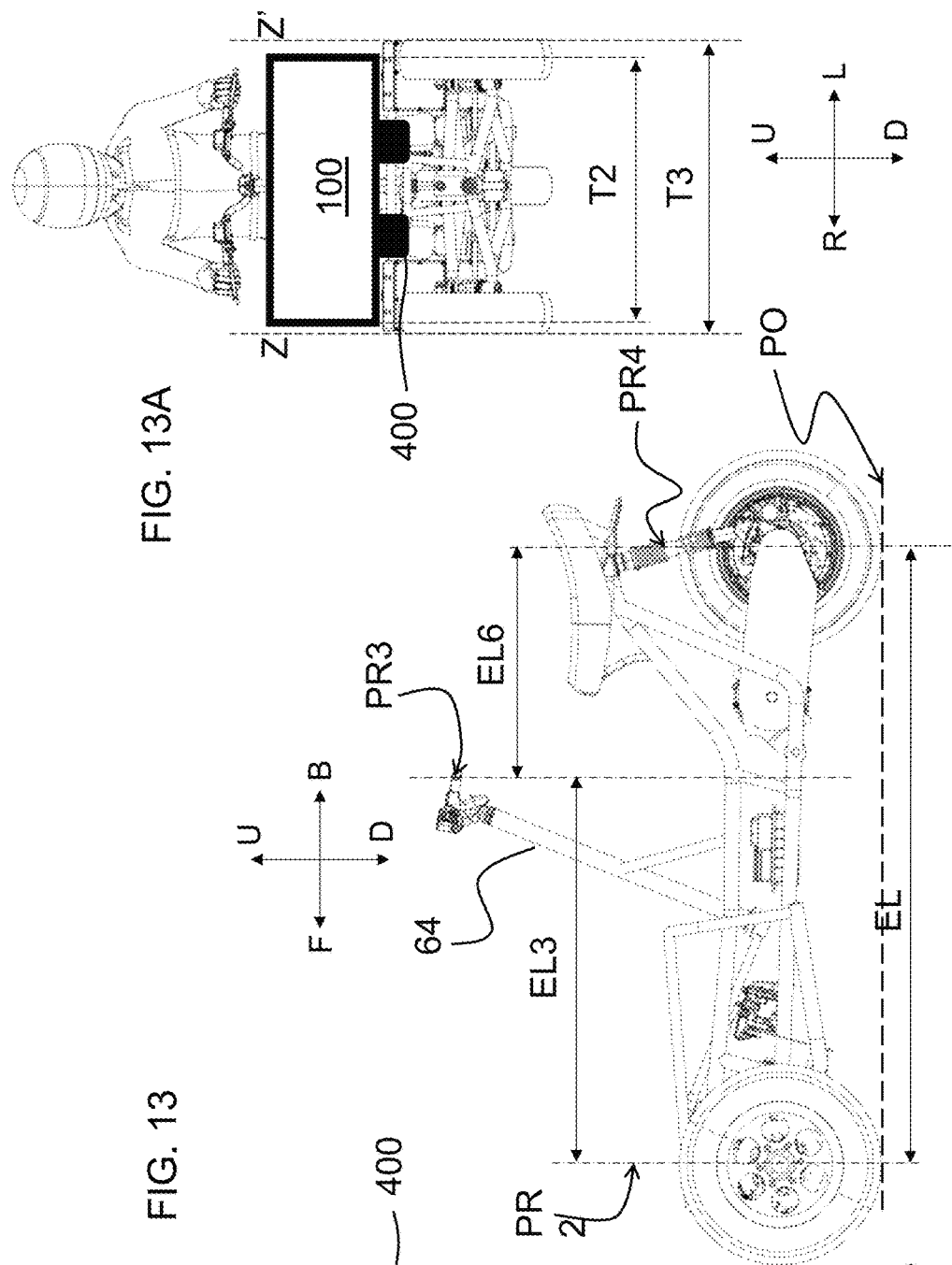
FIGS. 13 and 13A are front views, each relating to a possible embodiment of a motor vehicle according to the present invention.
FIG. 15 is a side view relating to a further possible embodiment of a motor vehicle according to the present invention.

FIGS. 13 and 13A refer to a possible embodiment of the invention, wherein the load structure 100 supported by the first cross member 11 is in the form of a compartment. More precisely, in the case illustrated, the lower cross member 11 has the configuration described above in the description of FIGS. 8 and 9 and the compartment 100 is connected to the upper portion 11B of the cross member itself. As indicated above, the lower cross member 11 could have a shape among those schematically shown in FIGS. 4-6 or still other possible shapes, however falling within the scope of the present invention.

In the embodiment of FIG. 13, the compartment 100 has a transverse extension T2 corresponding to the distance T1, taken along the direction R-L, between the inner sides of the front wheels 4, 4' identified by the two reference planes Z-Z'. Instead, specifically in FIG. 13A, the compartment 100 has a transverse extension T2 substantially corresponding to or slightly less than the distance T3 between the outer sides of the front wheels 4, 4' identified by the reference planes Z1-Z1'. Therefore, in the embodiment of FIG. 13A the transverse extension of the compartment 100 is in fact greater than the track (indicated by T3) of the vehicle, conventionally considered as the distance between the longitudinal planes of symmetry of the front wheels 4, 4'. The widths T1, T2 and T3 are evaluated in the condition of "straight-wheeled vehicle". The expression "transverse extension" of the compartment 100 is meant to indicate the maximum distance, evaluated along the transverse direction T and in the condition of straight wheels, between two points of the compartment 100. In some embodiments, the transverse extension T of the compartment 100 could be even greater than the distance between the outer sides of the front wheels 4, 4' identified by the reference planes Z1-Z1'.

In a possible embodiment thereof, schematically shown in FIGS. 16 and 17, the load compartment 100 comprises a bottom wall 100A and side walls 100B, 100C, 100D, which extend above the bottom wall so as to delimit a housing space suitable to completely or partially contain goods or people. In a possible embodiment, the compartment 100 could comprise two longitudinal walls 100B, i.e., which at least partially extend in the longitudinal direction, a front part 100C and a rear part opposite to the front part 100C. In a further embodiment, the compartment 100 could also comprise an upper wall which closes said housing space at the top.

In a possible embodiment thereof, said bottom part 100A and/or at least one side wall 100B, 100C, 100D of said compartment 100 is directly or indirectly connected to said lower cross member 11. In a possible modified embodiment, for example, the bottom wall 100A could be defined by a bottom/platform made of metallic material and connected directly to the lower cross member 11, also made of metallic material. Such a connection could be made, for example, by welding or by another technically equivalent process. Alternatively, irrespective of the materials used, the connection could be made through connection means of the mechanical type.

In the case of the cross member shown in FIGS. 8-9, for example, the platform 100A of the compartment 100 could be connected by welding to the upper portion 11B of the lower cross member 11. FIGS. 13 and 13A schematically indicate mechanical connection means 400 which could be, for example, screws, bolts, locking brackets, etc.

In an alternative embodiment, elastic means 145 are arranged between the compartment 100 and the lower cross member 11, configured to further cushion the load. In a possible embodiment thereof, said means may be, for example, spacers made of elastomeric material.

In a possible embodiment, the compartment 100 may be permanently connected to the lower cross member 11 (for example by resorting to the aforementioned welding). However, in an alternative embodiment, the compartment 100 could be connected to the lower cross member 11 in a removable manner, by providing suitable connection means adapted for this purpose. The possibility of completely removing the compartment 100 appears extremely advantageous in that it allows the motor vehicle 1 to be quickly adapted to the required operating conditions. In the event that the motor vehicle 1 is used, for example, for the delivery and/or distribution of goods (for example newspapers, flyers, food products, bottles, etc.), once the goods are exhausted, compartment 100 could be removed and replaced with another fully or partially loaded with other goods to be delivered.

In this hypothetical mode of use, the removability of the compartment 100 would therefore allow optimizing the time of supplying the goods to the advantage of a more rapid and versatile distribution. In this regard, the operation for replacing the compartment 100 could also be completely or partially automated. In fact, the compartment 100 could be located on or removed from the lower cross member 11 by means of automatic or semiautomatic lifting and/or moving means (for example through lifting forklifts or robotic arms, etc.). This solution could be particularly advantageous especially in the case of goods that are relatively heavy and/or complicated to move.

In an alternative embodiment (not shown), the compartment 100 may be configured to overturn around a hinge oriented transversely to the vehicle, so as to incline the bottom wall 100A. This solution may be particularly useful for example in the handling of inert materials. A piston may facilitate tilting the bottom wall 100A forward.

The compartment 100 could be replaced with an equivalent load structure (i.e., with an equal compartment) or alternatively also with another one of different shape and size. Therefore, in the hypothesis of the delivery and/or distribution of goods, the removal of the compartment 100 could lead not only to a potential increase in the speed of use, but also to an advantageous increase in the versatility of use of the motorcycle 1.

With reference to FIGS. 14 to 14C, the longitudinal extension E3 of the forecarriage 3 and therefore of the load structure (in the form of a compartment or not) may vary according to the transport capacity required of the motor vehicle 1 and/or also as a function of the (longitudinal and transversal) dimensions of the same. In the embodiment schematically shown in FIG. 14, for example, the compartment 100 extends in a longitudinal direction (direction F-B), passing a front vertical reference plane PR1 which is tangential to the front wheels 4,4'. In the variant schematically shown in FIG. 14A, the compartment 100 extends longitudinally up to the position of such reference plane PR1. In a further variant schematically shown in FIG. 14B, the compartment 100 extends only partially overlapping the front wheels 4, 4', while in the one in FIG. 14C, the compartment 100 remains between the front wheels 4, 4' and the handlebar 64 of the motor vehicle 1 without extending above the wheels themselves.

At least in the embodiments schematically shown in FIGS. 14, 14A, 14B, the load structure 100 is connected to the lower cross member 11 so as to define a wheel arch portion whose extension H depends on the stroke/excursion allowed by the suspension means 71, 71' indicated above. For the purposes of the present invention, the expression "wheel arch portion" means the distance between a horizontal plane tangential to the front wheels 4, 4' at their upper point and a plane tangential to the compartment 100 in its part closest to the wheels themselves. The extension H of the wheel arch portion is evaluated in a straight-wheeled vehicle condition, i.e., in the absence of roll.

In a possible embodiment of the motor vehicle 1 according to the invention, schematically shown in FIG. 15, the longitudinal extension EL3 of the forecarriage 3 is greater than the longitudinal extension EL6 of the rear end 6, where such extensions are evaluated on a lateral observation plane, with the vehicle upright and without steering. In particular, the longitudinal extension of the forecarriage 3 is considered as the distance between a second reference plane PR2, passing through the rotation axes of the front wheels 4, 4', and the tangential vertical reference plane 300 (defined above) at the rearmost point (i.e. towards the rear wheel 9) of the handlebar 64. The longitudinal extension EL6 of the rear end 6 is instead defined as the distance between said vertical reference plane 300 and a fourth transverse reference plane PR4 containing the rotation axis of the driving wheel 9.

In an alternative embodiment, schematically shown in FIG. 15, the longitudinal extension EL3 of the forecarriage 3 is included in a range of values between 0.5 and 0.8 of the longitudinal extension EL of the motor vehicle 1, where the latter is the distance between said second vertical plane PR2 and said fourth reference plane PR4 indicated above. The possible embodiment in which the longitudinal extension EL3 of the forecarriage 3 is less than or equal to the longitudinal extension EL6 of the rear end 6 also falls within the scope of the present invention.

According to an embodiment already mentioned above, the motor vehicle 1 according to the invention comprises one or more batteries B-B' installed in the forecarriage 3, and in particular connected and supported by the lower cross member 11. In a possible variant, one or more batteries could be connected to, and supported by, the upper cross member 12. As mentioned, this solution is particularly advantageous in the case in which the motor vehicle 1 has an electric or hybrid propulsion. However, this solution could also be applied in the case of a purely combustion engine propulsion. In fact, the service battery of the motor vehicle, i.e., the battery designed to allow the operation of the other electrical devices of the motor vehicle 1, could be connected to the lower cross member 11 (or to the upper one 12). Furthermore, irrespective of the propulsion envisaged for the motor vehicle 1, the batteries B-B' installed in the forecarriage 3 could be used to allow the operation of electrically operated equipment and/or devices supported or housed in the load structure (for example in compartment 100).

In the embodiment shown in FIG. 7, a first group of batteries B and a second group of batteries B' are provided, supported by the lower portion 11A of the first cross member 11, the configuration of which corresponds to the one described above in the description of FIGS. 8 and 9. More precisely, for each battery group B, B' two batteries B-B' are provided, supported by the two components 111A-2 of the second region 11A-2, having a substantially U-shaped configuration (see FIG. 9). These components 111A-2 less inclined towards the center line A-A than corresponding components 111B of the upper portion 11B. This particular configuration defines a useful space to place said batteries B-B'.

In the embodiment of FIG. 7, the two groups of batteries B, B' are installed substantially on the plane (indicated with 501-B in FIG. 9), on which the second region 11A-2 of the lower portion 11A of the lower cross member 11 extends. In possible variants, the batteries B-B' could also be installed orthogonally to such plane or oriented according to any other position.

However, the possibility of placing the batteries B-B' on the first cross member 11 also in a position different from that described falls within the scope of the present invention. Likewise, the possibility of configuring the lower cross member 11 differently by providing specific portions on which to install the batteries B-B' also falls within the scope of the present invention. Such portions could also be provided with means (for example guides) to facilitate the positioning or and subsequent removal of the batteries. Furthermore, as already mentioned above, suitable hollow supports may be provided, made integral with the cross member 11, to house the batteries B-B'. These supports could be movable between a position of use, in which the batteries remain in a retracted position in the forecarriage 3 and an outlet position, in which the batteries are easily accessible, to allow their removal and subsequent repositioning.

According to a further embodiment, when the load structure 100 is in the form of a compartment, the batteries B-B could also be positioned inside the space delimited by the compartment itself. For this purpose, the bottom of the compartment 100 could be substantially configured as a "drawer" to house said batteries B-B. The extraction and insertion of the batteries B-B could take place laterally, using the sliding guides. Alternatively, access to the drawer bottom could take place substantially from above, for example, by providing a removable closing element and/or a door that can be opened upwards.

As already mentioned above, the configuration of the load structure 100 may vary according to the purposes and therefore according to the nature of the transported load. In the case of the compartment structure, the space delimited thereby may be organized according to needs. The compartment could therefore be completely empty or have several compartments, possibly structured as a drawer or with doors. Similarly, the compartment could be internally provided with means (for example, they may include flexible belts, ropes, chains, brackets, mechanical locking elements, fabric, Velcro strips, etc.) to secure the goods and objects to be carried.

Depending on the performance required, the nature of the load and the conditions of use, the load structure 100 could be made of one or multiple materials. Metallic materials could be used, but also plastic or wood materials. In the case of the compartment configuration 100, for example, this could comprise a frame made of metallic material and suitable for connection to the lower cross member 11. The external cladding, i.e., the side walls making up the compartment, could instead be made of plastic or even wood.

The compartment 100 could also be configured for the transport of food and/or medicines or more generally of goods which require a controlled temperature to avoid the deterioration thereof during the journey. For this reason, the load compartment 100 could be configured with thermo-insulating materials and have a partially or totally heat-tight structure. Furthermore, the motor vehicle 1 could comprise a refrigerating unit (i.e. configuring a refrigeration circuit) associated with the compartment 100, to keep the temperature below a predetermined value. This could make the motor vehicle 1 according to the invention usable for the transport of ice creams, drinks, frozen foods or other foods that require low temperatures, possibly using power supply batteries installed in the front 3 (for example according to the principle indicated above in the comment of FIG. 7) to supply the electric current necessary for the refrigeration circuit. Therefore, the load compartment 100 could be configured in the same way as a refrigerator. In this regard, the refrigeration unit could be installed on the lower cross member 11 also in a position detached from the compartment itself, even though it is operationally associated with the same.

In the case of the transport and/or delivery of hot foods, the motor vehicle 1 could be provided with a heating unit (for example formed by electrical resistors and/or radiant modules) associated with the compartment 100 and designed to maintain the walls of the same above a predetermined temperature. This heating unit could also be totally integrated in the compartment 100, or provide components installed independently on the lower cross member 11. The heating unit could also be electrically powered by the supply batteries of the vehicle, for example installed in the front.

Figure 18:
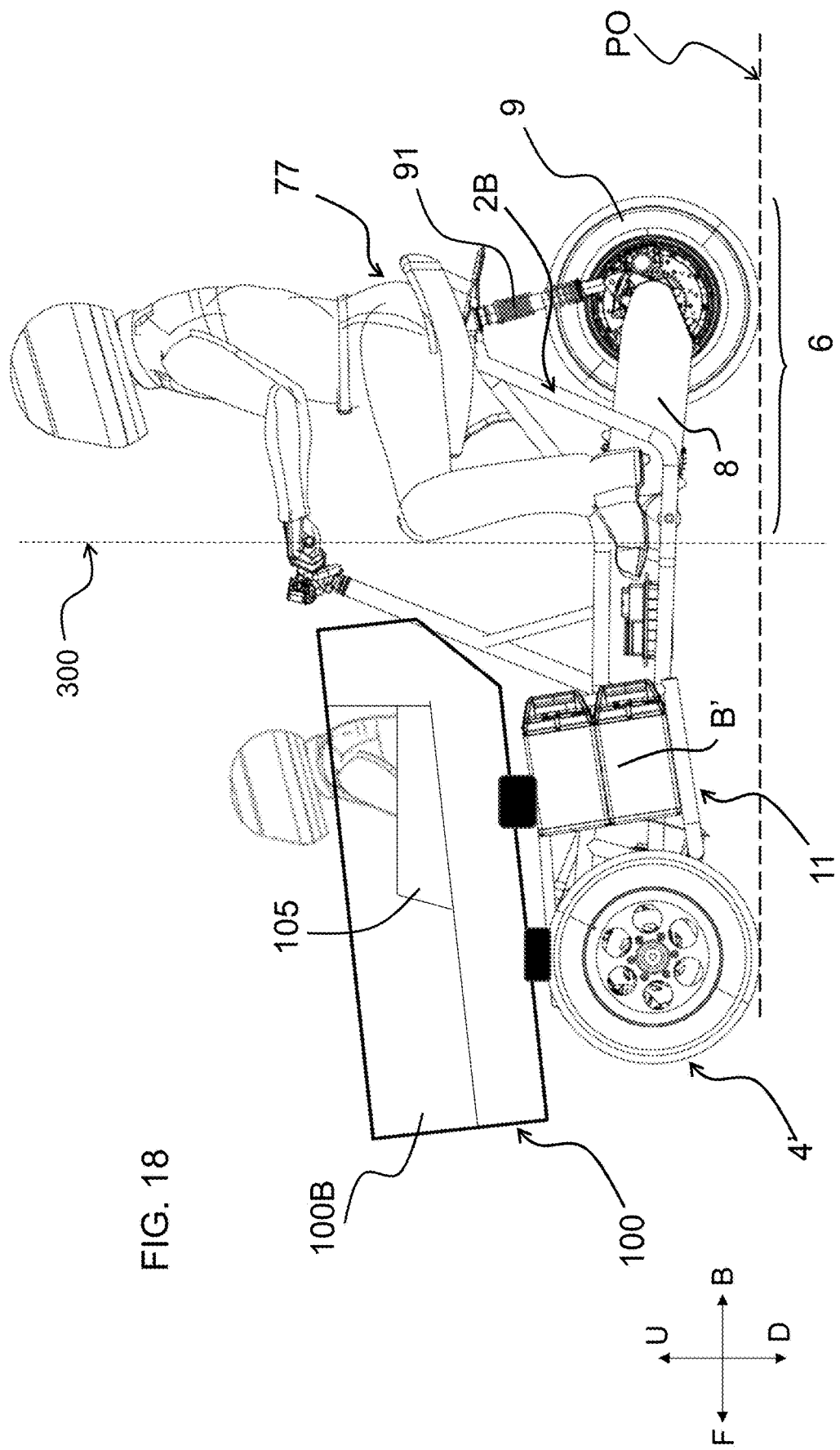
FIG. 18 is a side view relating to a further possible embodiment of a motor vehicle according to the present invention.

As mentioned above, in a possible modified embodiment (schematically shown in FIG. 18), the compartment 100 may also be configured for the transport of passengers or animals. For the transport of passengers, this compartment 100 will be open at the top and may contain one or more seats 105 inside. Depending on the configuration of the front end 3 and therefore on the dimensions of the compartment 100, these seats could be placed side by side in a transverse direction or be arranged in a longitudinal direction. Furthermore, for this form of use, in a possible embodiment the compartment 100 could also have side doors to facilitate access to the seats or a front door. In a further embodiment, safety means could also be arranged inside the compartment 100, such as for example safety belts and/or handles, to make passengers stay safer while the vehicle 1 is moving. In a further variant, the seats could be easily removable and/or foldable. Furthermore, as schematically shown in FIG. 18, in a possible variant the compartment 100 could be provided with a protection element 100B (such as for example a screen or a transparent fabric) to protect passengers from the air. The vehicle thus conceived allows the transport of up to four people like a traditional utility car, i.e., up to two on the saddle 77 of the motor vehicle 1 and up to two in the seats of the compartment 100.

In a further possible embodiment of the invention, the motor vehicle 1 comprises at least one front headlamp directly or indirectly connected to one of the two cross members 11, 12 of the four-bar linkage 10. In this regard, in the embodiment schematically shown in FIGS. 16 and 17, two headlamps 155, 155' are provided, integral with a front wall of the compartment 100. In this embodiment, the two headlamps 155, 155' are therefore directly connected to the lower cross member 11 right through the compartment 100. By comparing FIGS. 16 and 17 it can be observed that the headlamps 155, 155', even during the rolling movement, maintain the same behaviour as the compartment 100, that is, they do not change their orientation with respect to the support plane PO. This condition is particularly advantageous, as it leads to a substantially constant illumination of the roadway even when motor vehicle 1 tilts when making curves (condition in FIG. 17).

In a possible modified embodiment, the headlamps 155, 155' could be connected to the lower cross member 11 or even to the lower one. In a possible modified embodiment, a single headlamp could also be provided arranged at the center plane A-A. In any case, with respect to the condition of a vehicle with straight wheels (FIG. 17), during the rolling movement (FIG. 18) the headlamps 155, 155' move according to the movement of the four-bar linkage 10. Therefore, they vary their position with respect to the longitudinal vertical plane PV (transverse translation) and lower towards the support plane PO (vertical translation) without rotating around any longitudinal axis.

In a further possible embodiment, the motor vehicle 1 comprises two direction indicators 150, 150' directly or indirectly connected to one of the two cross members 11, 12 of the four-bar linkage 10. In this regard, in the modified embodiment shown in FIGS. 16 and 17, these indicators 150, 150' are integral with the compartment 100 and therefore indirectly connected to the first cross member 11. More precisely, in the last cited figures, the two indicators 150, 150' are arranged on longitudinal sides 100B-100B' so as to occupy a symmetrical position with respect to the center plane A-A, where this position is taken when the motor vehicle 1 is in the condition of straight wheels (FIG. 16). Also in this case, similarly to what is indicated above for the headlamps 155, 155', during the rolling movements, the indicators 155, 155' move in accordance with the movements of the four-bar linkage 10 being in any case integral with the lower cross member 11.

In a possible modified embodiment, the light indicators 150, 150' could be directly connected to one of the two cross members 11, 12 through connecting means which are completely independent of the compartment 100.

Advantageously, in order to reduce the movement of the load when the motor vehicle performs a rolling movement, in the embodiments illustrated above the configuration and position of the rolling four-bar linkage and of the front steered wheels is such that when the motor vehicle is upright with zero roll angle and in a non-steered condition on a horizontal support plane PO, the lower cross member 11 is at an intermediate height between the support plane of the motor vehicle and a point of maximum height of the left front wheel 4' and of the right front wheel 4. Moreover, advantageously, also the upper cross member 12 is preferably placed at an intermediate height between the support plane of the motor vehicle and a point of maximum height of the left front wheel 4' and of the right front wheel 4.

In the illustrated embodiments, the rotation axis of the left front wheel is at an intermediate height between a hinge 33' connecting the left upright 21' to the lower cross member 11 and a hinge 32' connecting the left upright 21' to the upper cross member 12; and the rotation axis of the right front wheel 4 is at an intermediate height between a hinge 33 connecting the right upright 21 to the lower cross member 11 and a hinge 32 connecting the right upright 21 to the upper cross member 12.

The technical solutions described above allow fully accomplishing the intended tasks and objects.

The invention claimed is:

1. A saddle riding motor vehicle comprising:
    a frame;
    a motor;
    a rear wheel;
    a left steering front wheel and a right steering front wheel;
    a rolling four-bar linkage connected to the frame, wherein the rolling four-bar linkage supports the left steering front wheel and the right steering front wheel allowing a rolling movement to the left steering front wheel and to the right steering front wheel;
    a steering unit rotatably connected to the frame to control the steering of the left steering front wheel and the right steering front wheel;
    a left suspension group interposed between the left steering front wheel and the rolling four-bar linkage, and a right suspension group interposed between the right steering front wheel and the rolling four-bar linkage, to allow a lifting and lowering movement of the left steering front wheel and of the right steering front wheel with respect to the rolling four-bar linkage;
    wherein the rolling four-bar linkage comprises: a first cross member hinged to the frame around a first lower roll axis; a second cross member hinged to the frame around a first upper roll axis, wherein the lower roll axis and the upper roll axis are parallel to each other and lying on a center plane of the motor vehicle; a right upright and a left upright, each hinged to the second cross member and to the first cross member at second roll axes parallel to the first lower roll axis and first upper roll axis;
    wherein the first cross member extends along a longitudinal direction of the motor vehicle; and
    wherein the first cross member comprises a lower portion and an upper portion, wherein the upper portion of the first cross member is configured to support a load and is located above the second cross member in any operating condition of the rolling four-bar linkage;
    and wherein, when the motor vehicle is upright and in a non-steered condition on a horizontal support surface, the first cross member is located at an intermediate height between the horizontal support surface of the motor vehicle and a point of maximum height of the left steering front wheel and of the right steering front wheel.

2. The motor vehicle according to claim 1, wherein the first cross member comprises a connecting portion which connects the upper portion to the lower portion.

3. The motor vehicle according to claim 1, wherein the first cross member comprises a front part which extends at least partly in front of the left upright and the right upright and a rear part which extends at least partially behind the left upright and the right upright, wherein the front part has a longitudinal extension with respect to the left upright and the right upright greater than the longitudinal extension of the rear part with respect to the left upright and to the right upright.

4. The motor vehicle according to claim 1, wherein the first cross member is arranged in a longitudinally advanced position with respect to the second cross member.

5. The motor vehicle according to claim 1, wherein for each of said left upright and right upright a support element is provided, which directly or indirectly supports the corresponding steering front wheel, each support element being rotatable with respect to the corresponding upright around a steering axis.

6. The motor vehicle according to claim 5, wherein the steering unit comprises a steering column operated by means of a handlebar and a lever mechanism which operatively connects the steering column to a steering bar, wherein the steering bar comprises two opposite ends, each of which is connected to a corresponding one of said support elements.

7. The motor vehicle according to claim 5, wherein each support element directly connects the corresponding upright to the corresponding steering front wheel, wherein each supporting element is in the form of a spindle associated with a rotation pin of the corresponding steering front wheel, and wherein the corresponding suspension group is interposed between the support element and the corresponding upright.

8. The motor vehicle according to claim 5, wherein each support element directly connects the corresponding upright to the corresponding steering front wheel, wherein for each steering front wheel said motor vehicle comprises:
    a spindle connected to the corresponding steering front wheel to allow the steering front wheel to rotate around the axis thereof;
    at least one crank hinged to the spindle and to the corresponding support element; and
    a shock absorber connected at one end to the support element and at the opposite end to said at least one crank or to said spindle.

9. The motor vehicle according to claim 1, comprising an anti-roll device configured to block the deformation of the rolling four-bar linkage.

10. The motor vehicle according to claim 1, wherein the load comprises a load structure connected to the first cross member wherein the load structure is configured to support and contain goods or passengers.

11. The motor vehicle according to claim 10, wherein the load structure has a transverse extension less than or equal to the width of the track defined by the transverse distance between the steering front wheels.

12. The motor vehicle according to claim 10, wherein the load structure defines a housing space adapted to completely or partially house goods or passengers.

13. The motor vehicle according to claim 10, wherein the load structure comprises a bottom wall and at least one side wall which extends above the bottom wall to delimit the housing space, wherein the bottom wall and/or at least one side wall of the load structure is directly or indirectly connected to the first cross member.

14. The motor vehicle according to claim 10, wherein the load structure is removably connected to the first cross member.

15. The motor vehicle according to claim 10, wherein the load structure comprises one or more seats for passengers.

16. The motor vehicle according to claim 10, wherein elastic means for cushioning the load are arranged between the load structure and the first cross member.

17. The motor vehicle according to claim 1, further comprising at least one of: a battery directly or indirectly connected and supported by the first cross member of the rolling four-bar linkage; a headlight directly or indirectly connected to the first cross member; a pair of direction indicators directly or indirectly connected to the first cross member of the rolling four-bar linkage.

18. The motor vehicle according to claim 1, wherein the rotation axis of the left steering front wheel is at an intermediate height between a hinge connecting the left upright to the first cross member and a hinge connecting the left upright to the second cross member; and the rotation axis of the right steering front wheel is at an intermediate height between a hinge connecting the right upright to the first cross member and a hinge connecting the right upright to the second cross member.

19. The motor vehicle according to claim 1, wherein the second cross member is placed at an intermediate height between the horizontal support plane of the motor vehicle and a point of maximum height of the left steering front wheel and of the right steering front wheel.

20. The motor vehicle according to claim 1, wherein:
the left suspension group is configured to provide relative movement between the left steering front wheel and the left upright;
the right suspension group is configured to provide relative movement between the right steering front wheel and the right upright.

21. The motor vehicle according to claim 1, wherein:
a majority of the upper portion of the first cross member is arranged behind a rotating axis of the right and left steering front wheels.

* * * * *